(12) United States Patent
Neskin et al.

(10) Patent No.: US 9,826,715 B2
(45) Date of Patent: Nov. 28, 2017

(54) REMOTE INTERACTION DEVICE

(71) Applicant: PETCUBE, INC., Wilmington, DE (US)

(72) Inventors: Oleksandr Neskin, Dnipropetrovsk (UA); Iaroslav Azhniuk, Kyiv (UA); Andrii Kulbaba, Kyiv (UA)

(73) Assignee: PETCUBE, INC., Wilmington, DE (US)

( * ) Notice: Subject to any disclaimer, the term of this patent is extended or adjusted under 35 U.S.C. 154(b) by 162 days.

(21) Appl. No.: 14/186,793

(22) Filed: Feb. 21, 2014

(65) Prior Publication Data

US 2014/0233906 A1 Aug. 21, 2014

Related U.S. Application Data

(60) Provisional application No. 61/767,310, filed on Feb. 21, 2013.

(51) Int. Cl.
*H04N 5/77* (2006.01)
*A01K 15/02* (2006.01)
*A01K 29/00* (2006.01)
*H04N 5/765* (2006.01)

(52) U.S. Cl.
CPC .......... *A01K 15/021* (2013.01); *A01K 15/025* (2013.01); *A01K 29/00* (2013.01); *H04N 5/765* (2013.01); *H04N 5/772* (2013.01); *H04N 2209/04* (2013.01)

(58) Field of Classification Search
CPC ...... A01K 15/021; A01K 29/00; H04N 5/772; H04N 5/765; H04N 5/2256; H04N 5/23293
USPC ......................................... 386/224
See application file for complete search history.

(56) References Cited

U.S. PATENT DOCUMENTS

| 7,878,945 | B2 | 2/2011 | Ungari |
| 2002/0071661 | A1* | 6/2002 | Nakano ............... G11B 27/031 386/230 |
| 2002/0198516 | A1 | 12/2002 | Knopp et al. |
| 2007/0068017 | A1 | 3/2007 | Tamura et al. |
| 2008/0180537 | A1* | 7/2008 | Weinberg ............ H04N 5/2256 348/211.99 |
| 2008/0216765 | A1 | 9/2008 | Kates |

(Continued)

FOREIGN PATENT DOCUMENTS

| WO | WO 2011/110814 A2 | 9/2011 |
| WO | WO PCT/US14/17772 | 7/2014 |
| WO | WO PCT/US2014/017772 | 8/2015 |

OTHER PUBLICATIONS

EP, 14754660.0 Extended Search Report, dated Oct. 27, 2016.

*Primary Examiner* — Thai Tran
*Assistant Examiner* — Jose Mesa
(74) *Attorney, Agent, or Firm* — One LLP

(57) ABSTRACT

Systems, devices, and methods are provided for remote interaction with a subject in an environment. The device has audio-visual recording and transmitting functionality to provide an operator at a remote location with an audio-visual feed of the environment near the device. The device also has a light emission component which the operator controls and which projects light onto a surface in the environment in the vicinity of the device. The systems, devices, and methods provide operators with the ability to interact with pets and provide exercise and stimulation to pets when their owners are away.

9 Claims, 23 Drawing Sheets

(56) References Cited

U.S. PATENT DOCUMENTS

| | | | |
|---|---|---|---|
| 2009/0215533 A1* | 8/2009 | Zalewski | A63F 13/00 |
| | | | 463/32 |
| 2010/0064325 A1* | 3/2010 | Fishman | H04N 7/17318 |
| | | | 725/61 |
| 2010/0238194 A1 | 9/2010 | Roach | |
| 2011/0166694 A1* | 7/2011 | Griffits | G07F 9/02 |
| | | | 700/215 |
| 2013/0068173 A1* | 3/2013 | Jamison | A01K 15/021 |
| | | | 119/707 |
| 2013/0201331 A1* | 8/2013 | Gelfand | A01K 15/025 |
| | | | 348/143 |

* cited by examiner

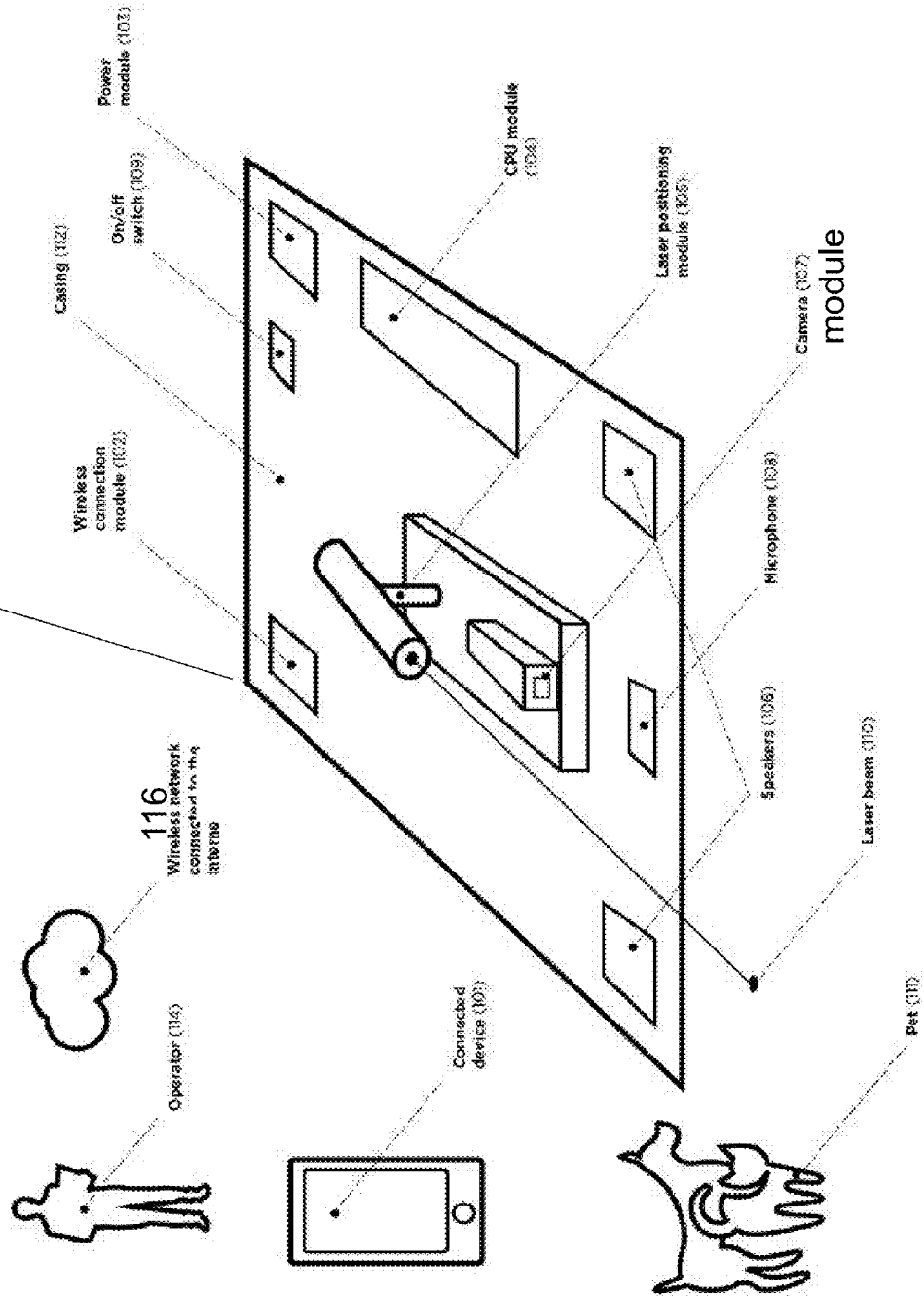

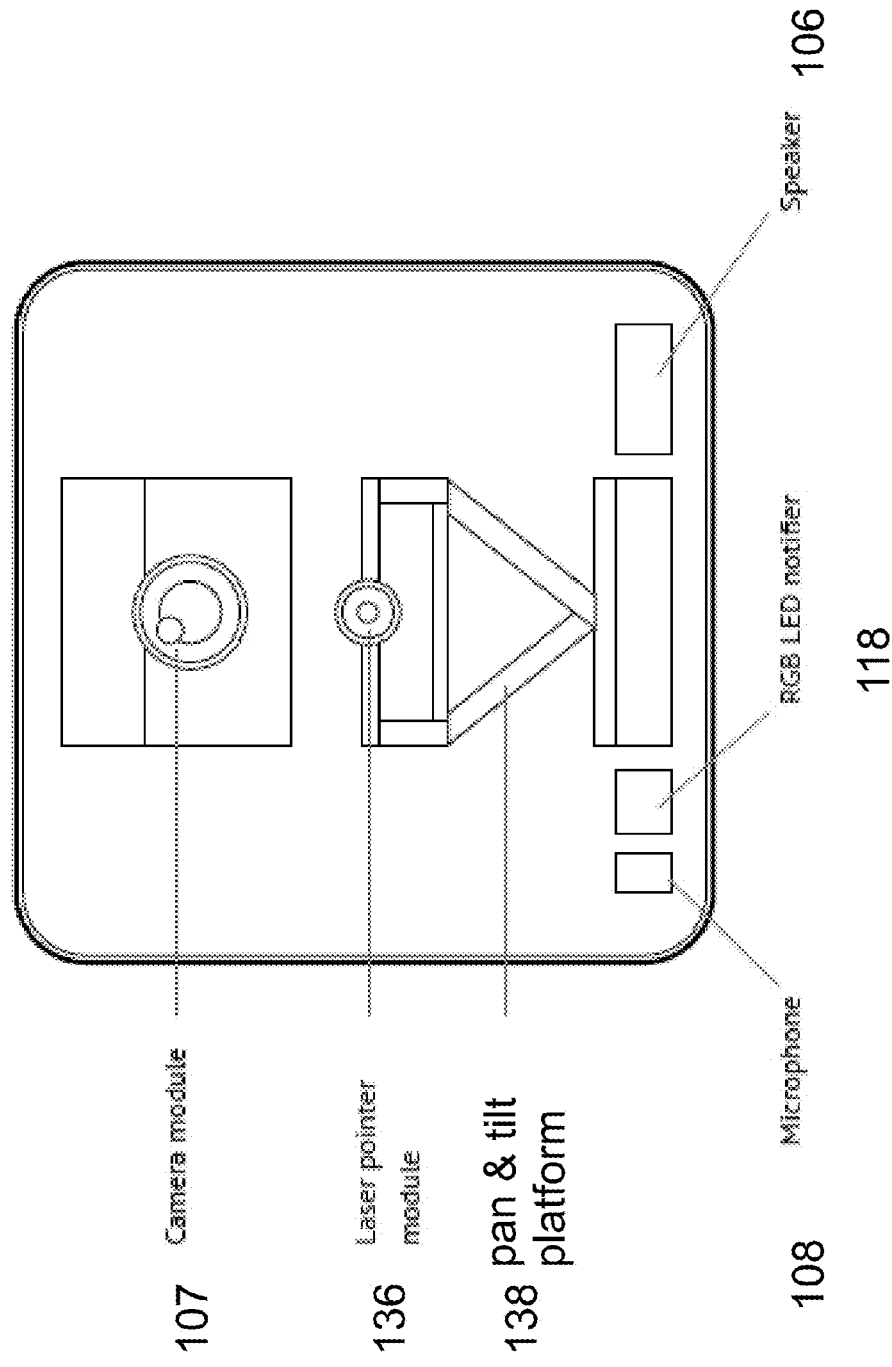

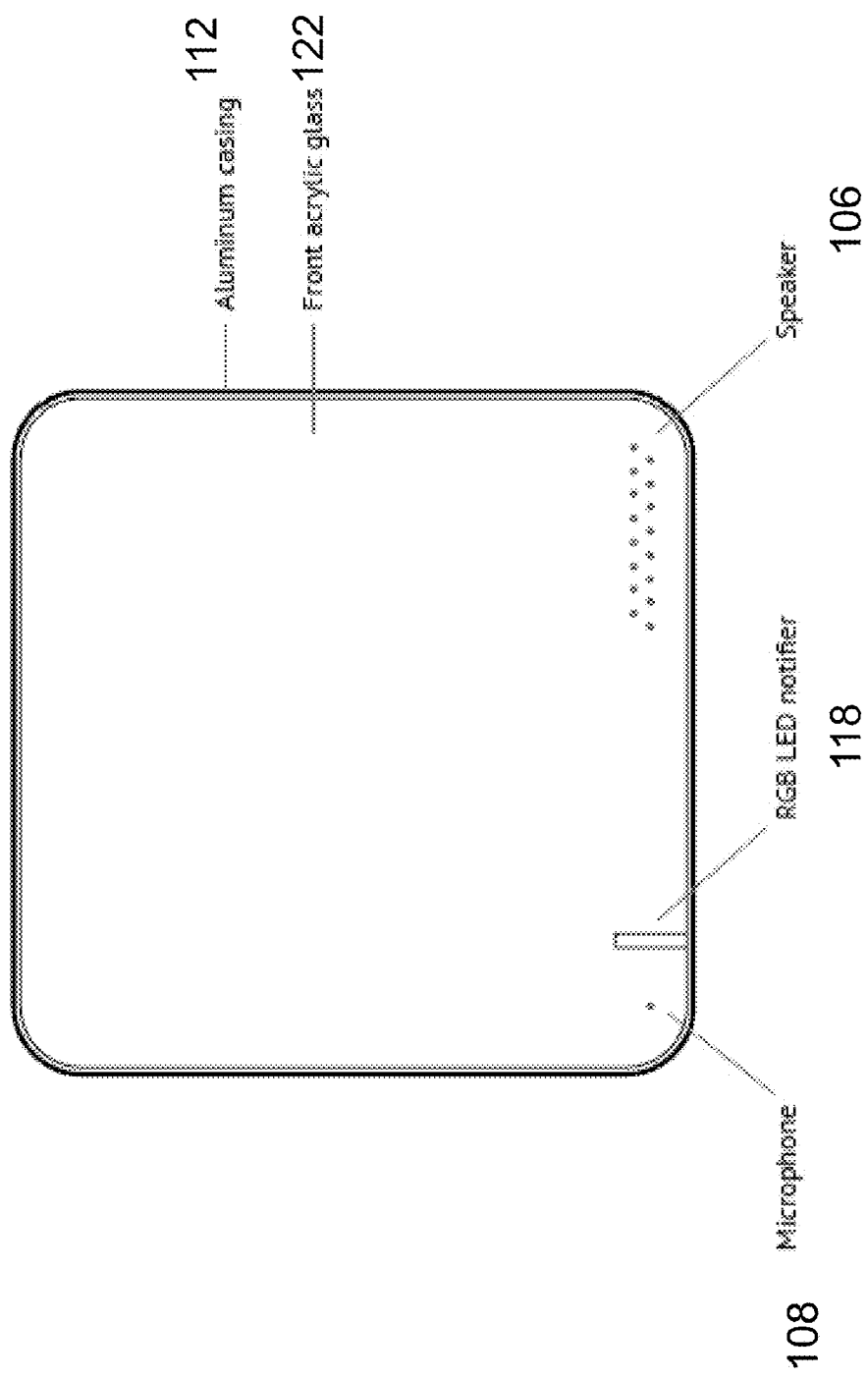

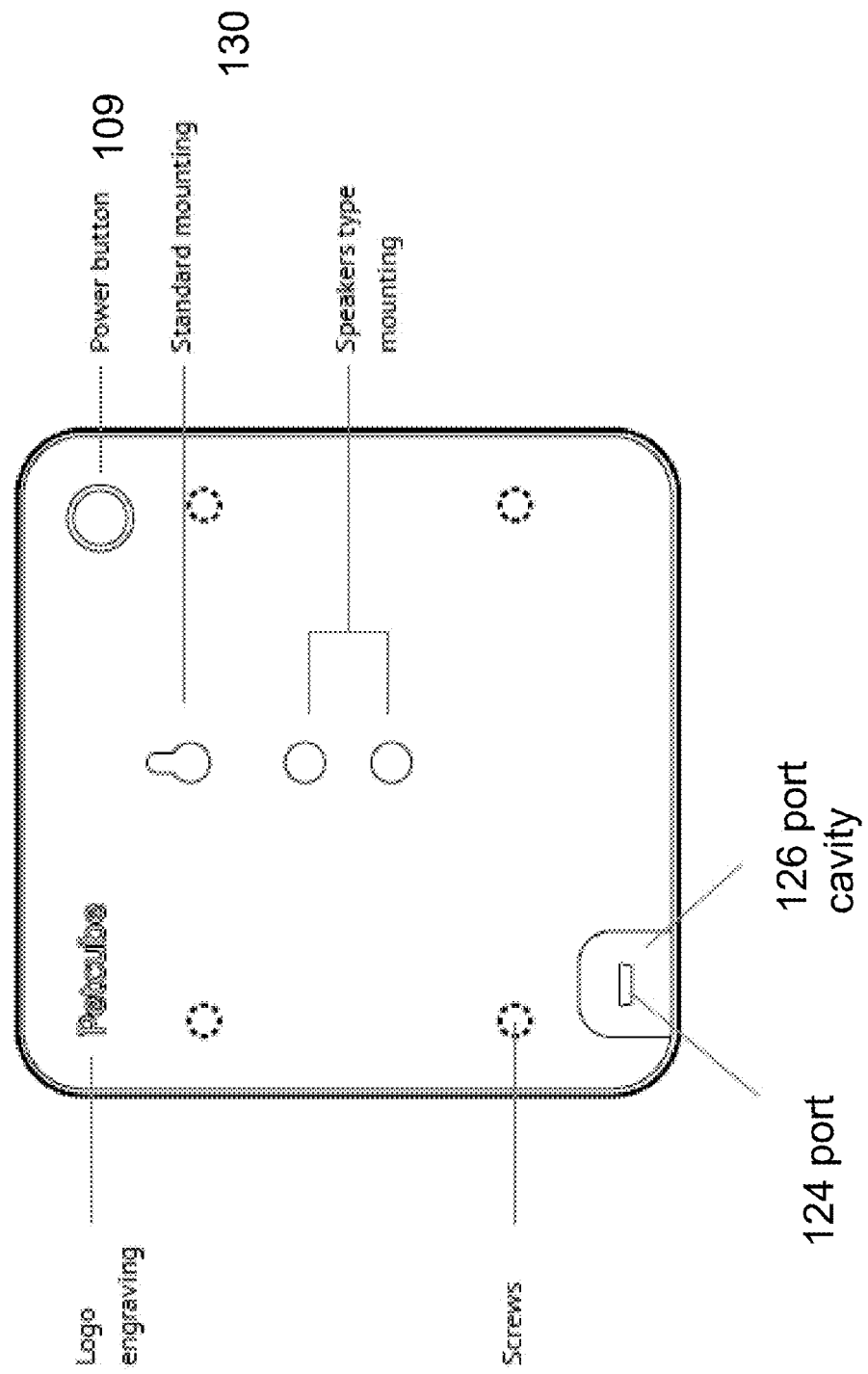

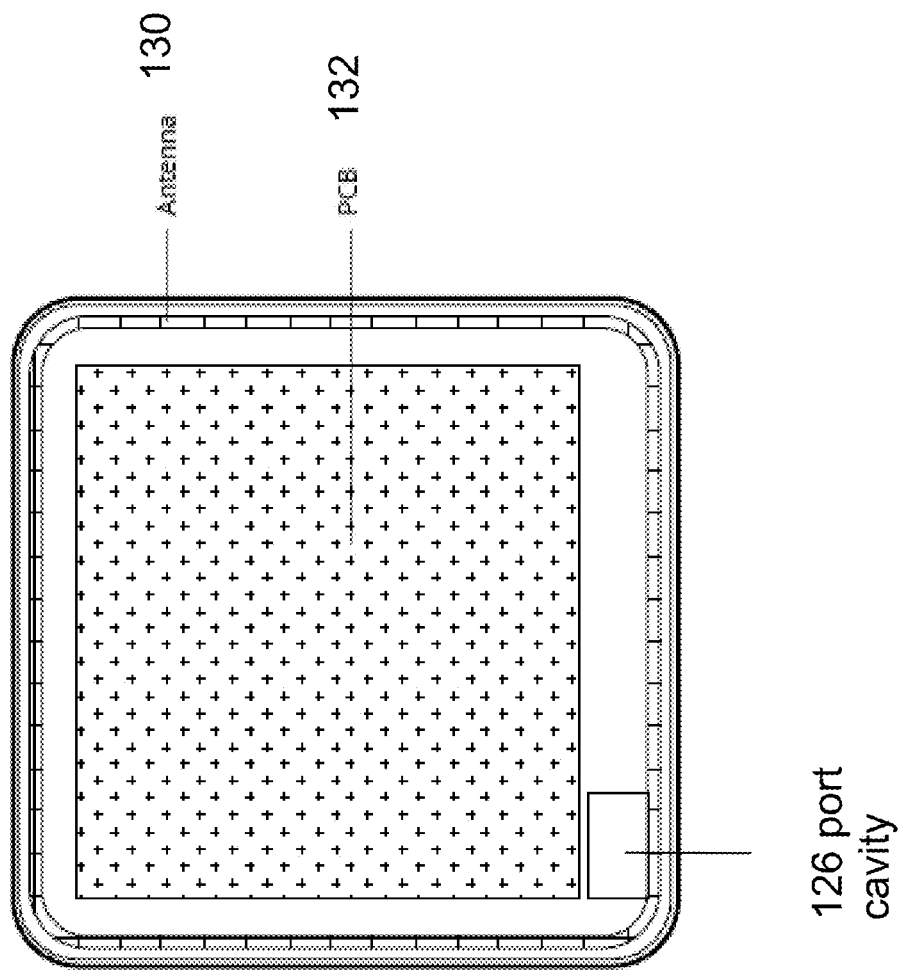

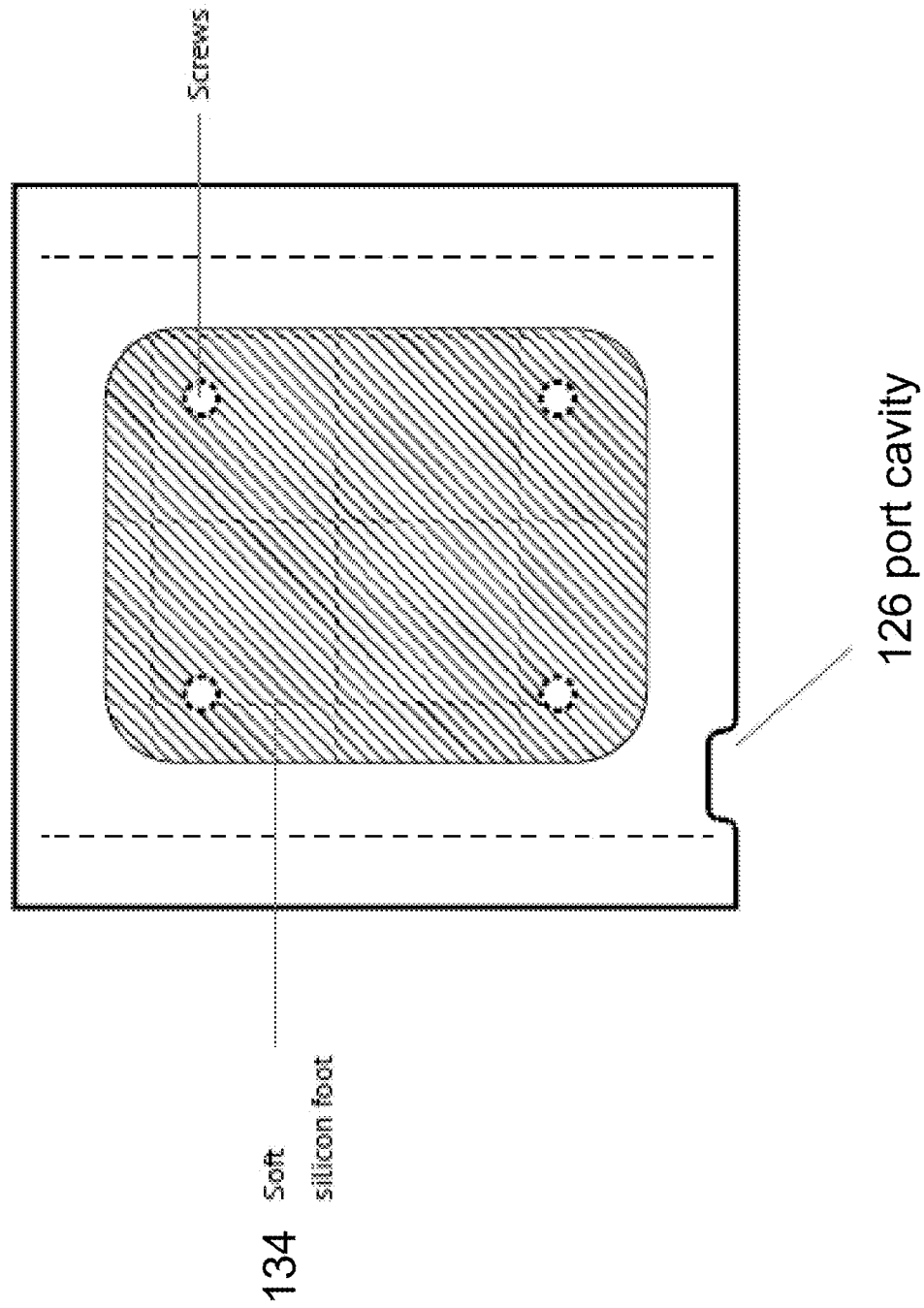

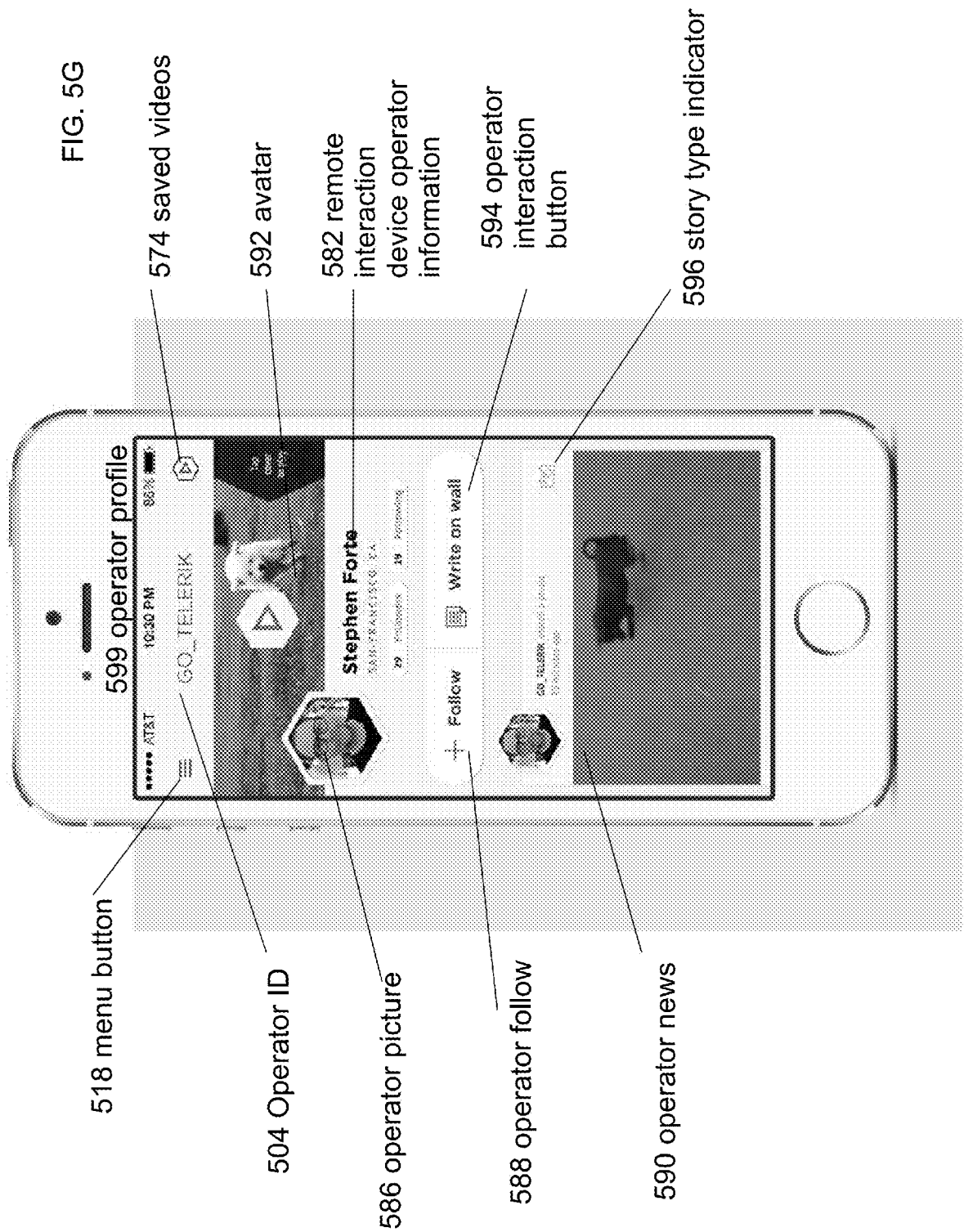

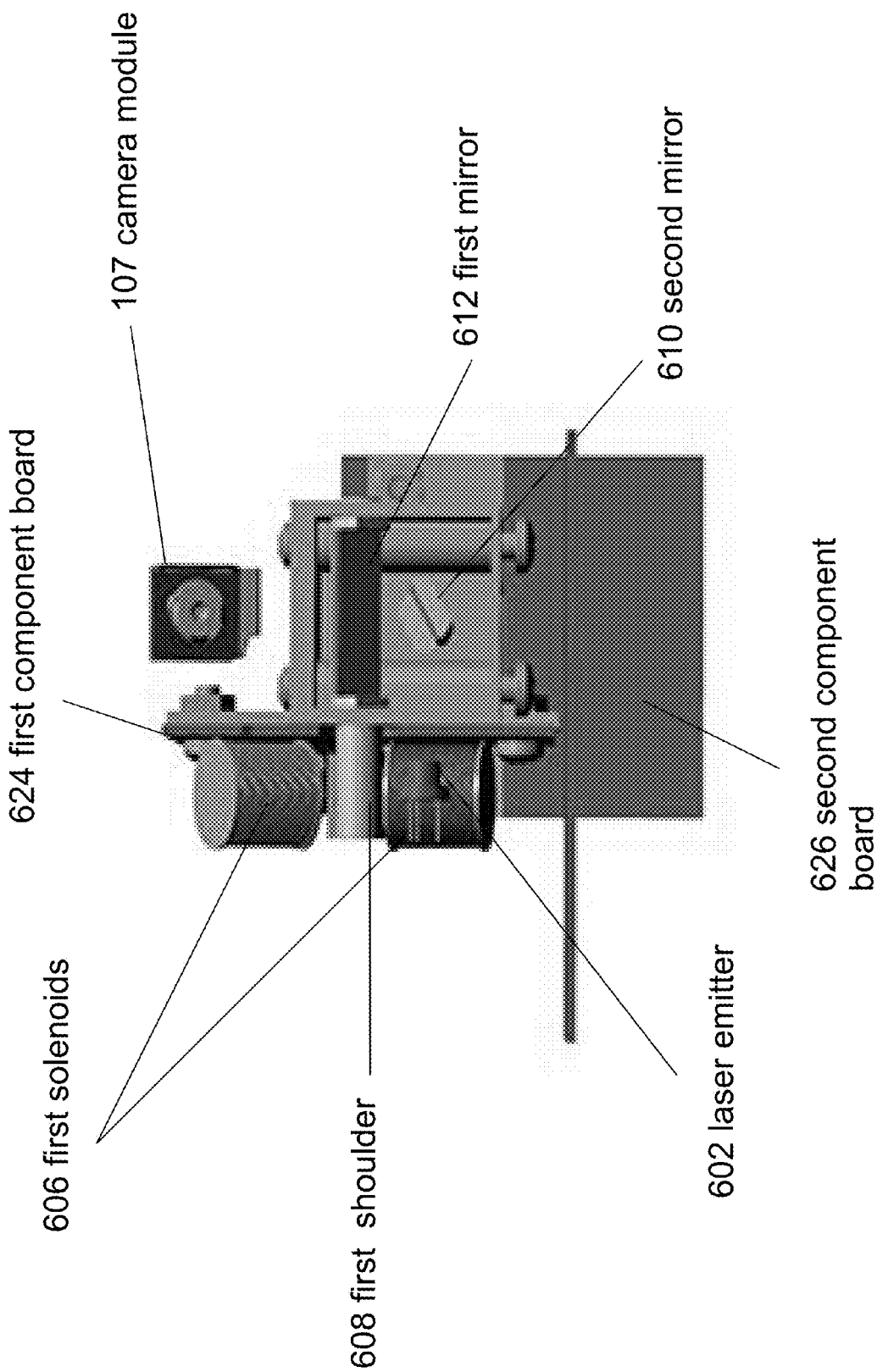

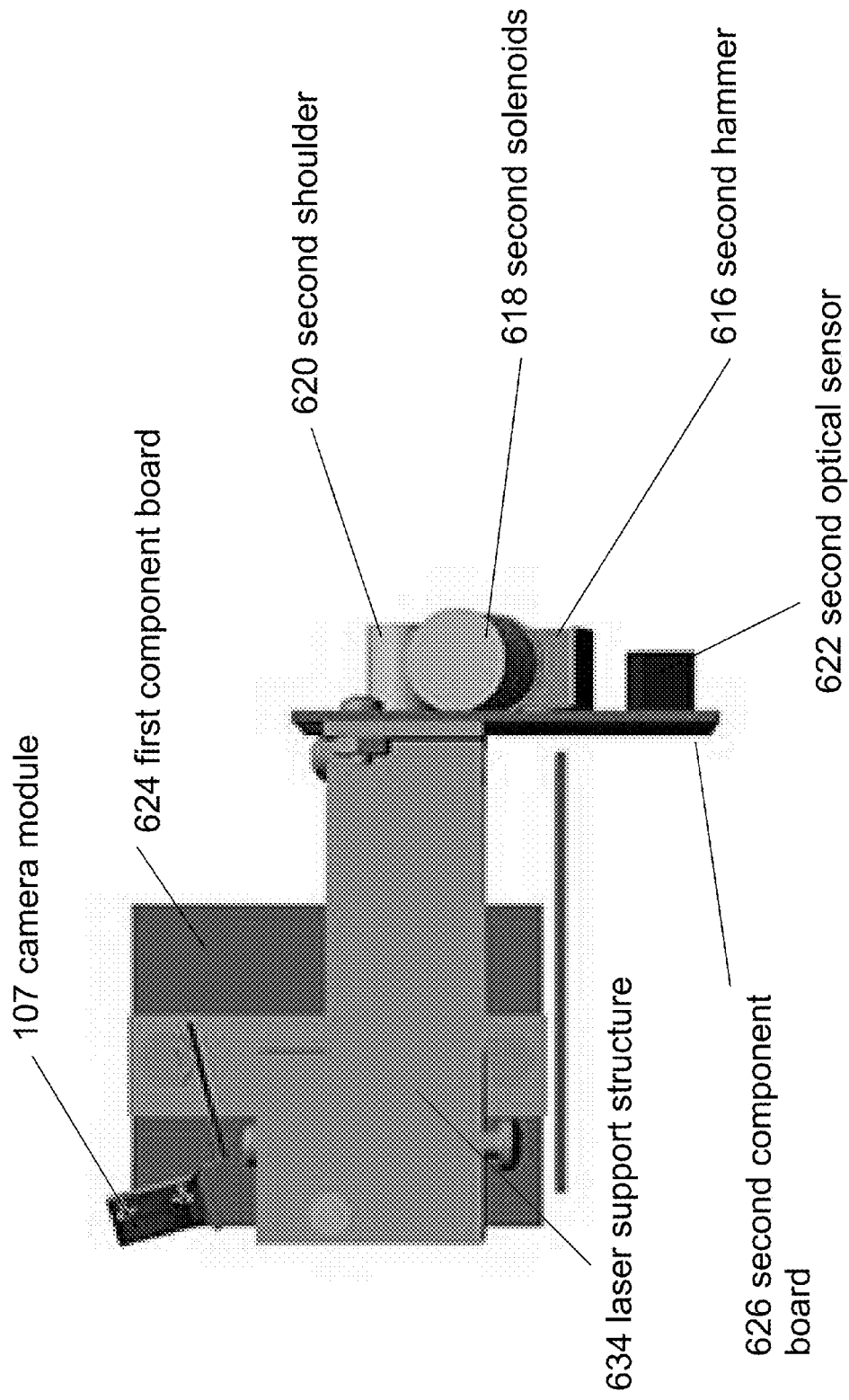

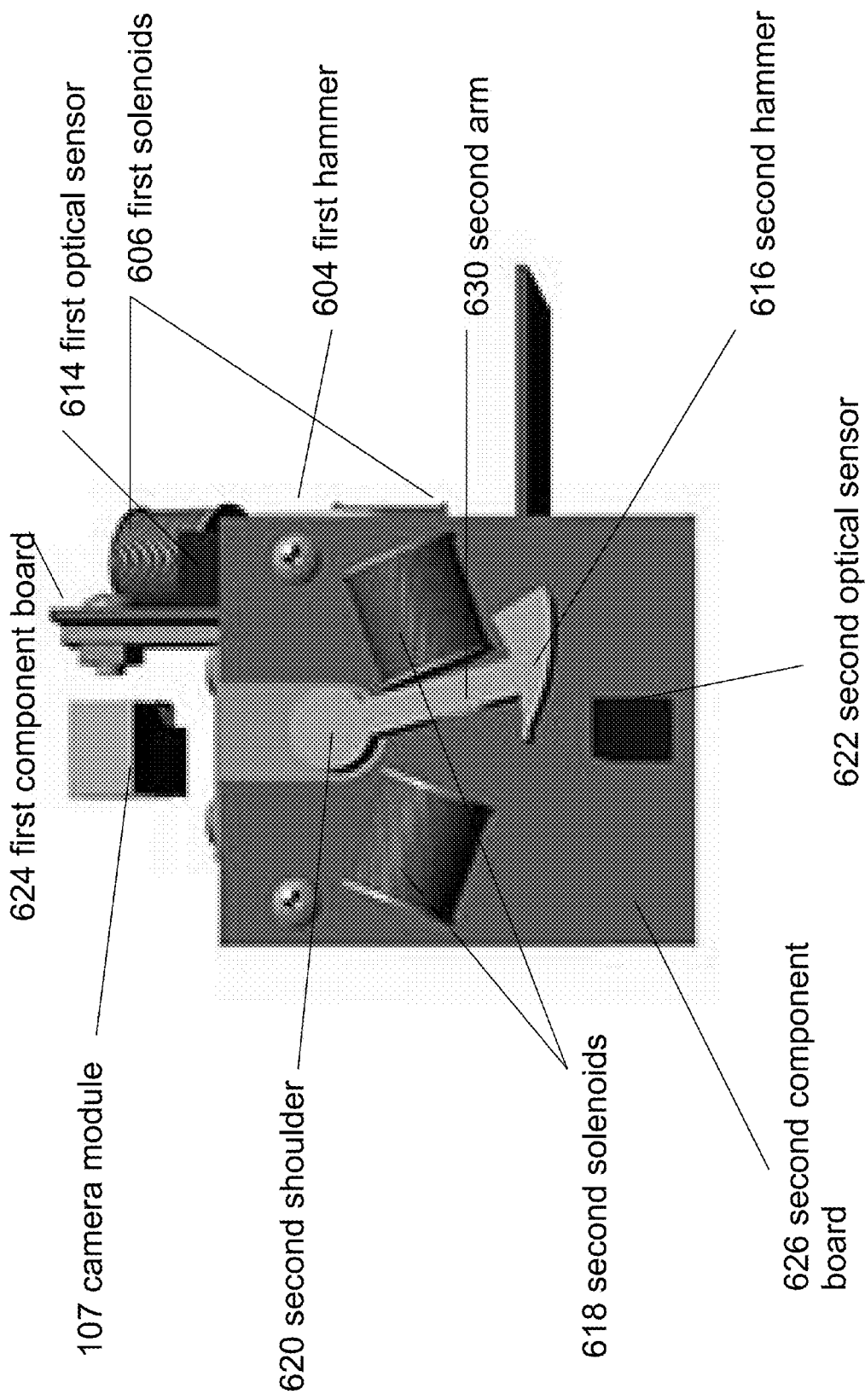

REMOTE INTERACTION DEVICE

CROSS-REFERENCE TO RELATED APPLICATIONS

The present application claims priority to U.S. Provisional Application No. 61/767,310 filed Feb. 21, 2013, which is hereby incorporated by reference in its entirety.

FIELD

The subject matter described herein relates generally to a remote interaction device, and more particularly to a device at a first location which allows a user at a second, remote location to view, hear, and interact with a user at the first location—the user at the first location generally being an animal such as a dog, cat, or other pet and the user at the second location generally being an owner or other human.

BACKGROUND

Presently, pet owners generally interact with their pets only when they are in the same general location, such as a home. Many pet owners are required to leave their pets alone and unsupervised for numerous hours every day when the pet owner goes to work, runs errands, or leaves town on trips or vacations. Some pets become bored, lethargic, or sedentary when left alone. This can lead to numerous health problems including obesity and depression. Alternatively, some pets become ornery and mischievous when left alone. This can lead to property damage, barking which irritates neighbors, and in extreme cases injury or death of the pet may occur.

One attempted solution to a lack of interaction and stimulation for pets has been to hire pet sitters who may take care of pets while the pet owner is away. Pet sitters often charge an hourly fee and may do little more than feed the pet before leaving. In some cases the pet owner may never know that the pet sitter did not interact with the pet for more than a few minutes. Even in the case of a pet sitter who plays with the pet, the pet owner does not receive the direct benefit of interacting with the pet personally.

Other attempted solutions have included leaving televisions or radios on for the pet while the pet owner is away, attempting to use automatically controlled toys, electro-shock punishment for misbehaving, and passive surveillance systems which provide one-directional monitoring of the pet. Each of these passive and active systems has its own drawbacks ranging from being inefficient to inhumane.

Accordingly, an remote interaction device for interacting with pets would be desirable.

SUMMARY

The present invention is directed to a remote interaction device, and more particularly to a remote interaction device that allows pet owners to interact with pets from a remote location.

In accordance with one aspect of the present invention, a remote interaction device is provided. The device generally includes a video recorder, an acoustic transducer, a microphone, an antenna for transmitting and receiving data, a processor, a photonic emission device and photonic emission aiming device, and a power supply. Each of these elements is included in a single device.

The photonic emission device is generally a laser which can be controlled by a user at a remote location by issuing commands. The user commands are received by the device, processed, and control electromagnets. The electromagnets in turn control a movable platform to which the laser is attached.

Other systems, devices, methods, features and advantages of the subject matter described herein will be or will become apparent to one with skill in the art upon examination of the following figures and detailed description. It is intended that all such additional systems, devices, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF THE FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIG. 1 is a visual representation of an example embodiment of the device and subjects.

FIG. 2A is a cutaway of the front of remote interaction device in accordance with the present invention.

FIG. 2B is a view of the front of remote interaction device in accordance with the present invention.

FIG. 2C is a view of the rear of remote interaction device in accordance with the present invention.

FIG. 2D is a cutaway of the rear of remote interaction device in accordance with the present invention.

FIG. 2E is a view of the bottom of remote interaction device in accordance with the present invention.

FIG. 5G is a visual portrayal of the user interface to interact with a profile associated with another associated with a remote interaction device in accordance with the present invention.

FIG. 6C is a diagram of a front perspective of a laser beam positioning device in accordance with the present invention.

FIG. 6D is a diagram of a side perspective view of a laser beam positioning device in accordance with the present invention from the opposite side of FIG. 6B.

FIG. 6E is a diagram of a rear perspective view of a laser beam positioning device in accordance with the present invention.

DETAILED DESCRIPTION

Figure 2F:
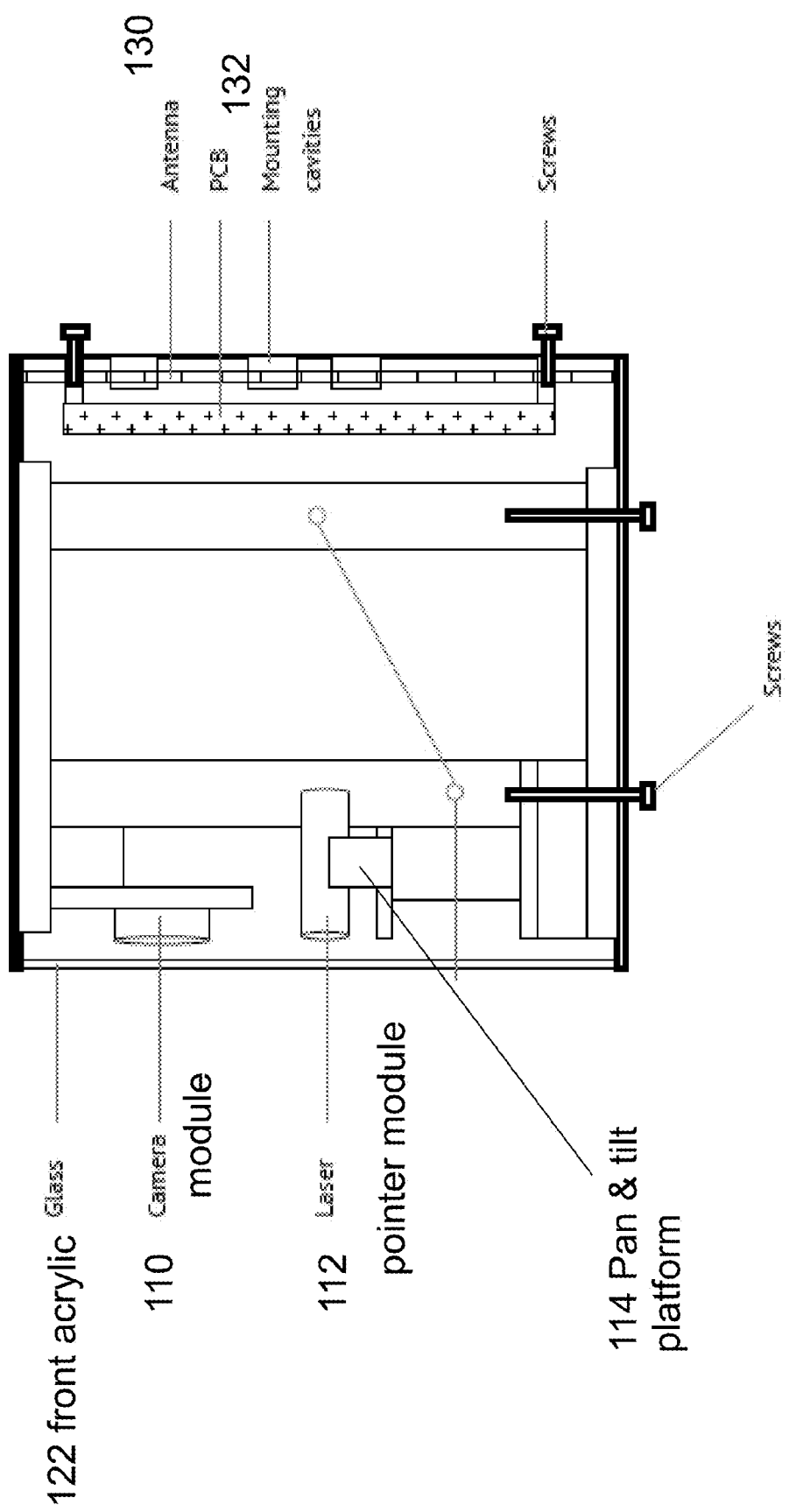
FIG. 2F is a cutaway of the side of remote interaction device in accordance with the present invention.

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

As used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present disclosure is not entitled to antedate such publication by virtue of prior disclosure. Further, the dates of publication provided may be different from the actual publication dates which may need to be independently confirmed.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

Turning now to the drawings, FIG. 1 is a visual representation of an example embodiment of the device and subjects. FIG. 1 shows an operator 114, connected device 101, pet 111, wireless network connected to the internet 116, and remote interaction device 100.

In the example embodiment shown in FIG. 1, operator 114 is a pet owner or other human. Operator 114 is able to interact with pet 111 at a remote location by using connected device 101 to monitor and control remote interaction device 100. Connected device 101 in the example embodiment is a tablet computer but in other embodiments connected device 101 may be a desktop, laptop, or notebook computer, wearable computer such as a smart watch, glasses or contact lenses, a smart phone, or any other device with wireless network connectivity. Remote interaction device 100 and connected device 101 are connected to each other wirelessly over wireless network connected to the internet 116. In some embodiments wireless network connected to the internet 116 is a broadband wireless network or other high bandwidth packet switch network.

Remote interaction device 100 in the example embodiment is made of various modules and components which facilitate operator 114's interaction with pet 111. Remote interaction device 100 connects to wireless network connected to the internet 116 using wireless connection module 102. Wireless connection module and other modules and components receive power from power module 103 which is governed by on/off switch 109. On/off switch 109 is also referred to as power button 109 in this application. In the example embodiment power module 103 receives power via USB interface although in other embodiments other interfaces are used. CPU module 104 is a central processing unit which governs all systems and processes overall in remote interaction device 100.

Microphone 108 and camera module 107 provide for audio and visual data capture at the location of remote interaction device 100 and allow operator 114 to view and hear what is going on at the location of remote interaction device 100 using connected device 101. Laser positioning module 105 is operatively connected to laser beam 110 and controls its positioning. Laser beam 110 and speakers 106 allow operator 114 to interact with the location of remote interaction device 100 by providing visual stimulation and audio stimulation respectively for pet 111. Casing 112 provides a protective housing for all components and modules of remote interaction device 100.

FIG. 2A shows a cutaway of the front of remote interaction device 100 in accordance with the present invention. The remote interaction device 100 shown in FIG. 1 is a view from the front of the device and generally includes camera module 107, laser pointer module 136, pan and tilt platform 138, microphone 108, RGB LED notifier 118, and speaker 106.

Each of the components shown in FIG. 2A may be located at different locations within the device from those shown in the example embodiment but in general, the camera module 107 and laser pointer module 136 face outward from the same face of the device so as to allow camera module 107 to record a video feed in the same direction that laser pointer module 136 allows for interaction with the environment, such as shining on a surface.

Camera module 107 in the example embodiment is a video recording device with a wide angle lens which allows for a video recording of the environment in front of camera module 107. In the example embodiment camera module 107 is a CMOS sensor and a camera lens as well as a printed circuit board (PCB). In other embodiments camera module 107 uses other digital video recording devices or other appropriate video recording devices. A wide angle lens is used in the example embodiment to allow for video recording of the environment without the need to move the camera to follow particular subjects or specific locations within the field of view of camera module 107. In other embodiments other appropriate lenses are used.

In the example embodiments, camera module 107 is an internet protocol (IP) camera which can send and receive data over computer networks such as the internet. These cameras are sometimes referred to as webcams. In the example embodiment camera module 107 is a decentralized IP camera which has local storage and does not require a network video recorder (NVR) although in other embodiments centralized IP cameras may be used. In the example embodiment camera module 107 captures high definition (HD) video although in other embodiments lower definition video is captured.

Camera module 107 in some embodiments has focusing capabilities which allow for focusing based on the distance of a subject from camera module 107. In some embodiments the focusing capability is performed automatically by internal processing of a camera processor which is operable to process visual data signals from camera module 107. In some embodiments focusing is performed manually by a user at a remote location by engaging an appropriate command on connected device 101.

In some embodiments additional components are provided in camera module 107 such as camera aiming devices, alternate and/or changeable filters, and others which allow a user to view different areas of the room by positioning the direction of the camera and viewing through different filters. In some embodiments automatic motion-capture components are used in order to direct the camera to capture movement in the environment such as movement of pet 111.

Laser positioning module 105 in the example embodiment is made of laser pointer module 136 in the example embodiment is a laser pointer which emits light through optical amplification. Light emitted by laser pointer module 136 is directed to a specific location in the environment such as on a surface. Typical surfaces may be floors, furniture, walls, or others. Many animals become interested in light such as lasers projected on surfaces. These animals will follow the light and try to catch it or capture it, providing entertainment for the animal. In the example embodiment laser pointer module uses a laser which is safe for use around humans and animals.

Pan and tilt platform 138 in the example embodiment is a platform to which laser pointer module 136 is mounted. Pan and tilt platform 138 provides the mechanical support which controls the physical location that laser module 136 is pointing laser beam 110. In the example embodiment electromagnets control the panning and tilting of pan and tilt platform 138. Pan and tilt platform 138 is described later in this application and is also referred to as laser positioning device 600. Electromagnets are advantageous over other aiming mechanisms such as servo-motors because electromagnets typically provide better reliability than servo-motors. Additionally, electromagnets are currently less expensive and quieter than servo-motors thus reducing costs and noise of the device respectively. Electromagnets also provide greater precision in aiming applications than servomotors.

Microphone 108 in the example embodiment is a microphone which is operable to receive audio input signals from the environment such as barking from a dog, meowing from a cat, or others. In the example embodiment microphone 108 is coupled to a processor which is operable to recognize when a sound is made in the environment. In some embodiments this may trigger processes within remote interaction device 100 such as notifying operator 114 via connected device 101 that noise is being made near remote interaction device 100, beginning visual recording using camera module 107, or others.

RGB LED notifier 118 in the example embodiment is a light emitting diode (LED) which indicates the status of remote interaction device 100. In some embodiments status indications include power, standby, transmit/receive, charging, or others. RGB LED notifier 118 indicates different device status in some embodiments by flashing, constant color display, alternating color display, or others. RGB LED notifier 118 in the example embodiment is a single RGB LED. In other embodiments RGB LED notifier 118 may include multiple RGB LED's in various configurations.

Speaker 106 in the example embodiment is a speaker device which outputs audio signals into the environment near remote interaction device 100. Speaker 106 in the example embodiment is operable to output audio signals such as a human voice, music, or other sounds received from operator 114 via connected device 101 over wireless network connected to the internet 116 and processed by an audio processor so as to communicate with pet 111 near remote interaction device 100. In some embodiments multiple speakers may be used.

Turning to FIG. 2B a front view of remote interaction device 100 is shown with front acrylic glass 122 attached and covering the interior components. In the example embodiment front acrylic glass 122 is a uniform piece of acrylic glass except in the locations of microphone 108, RGB LED notifier 118, and speaker 106 which each have cutouts, such as holes, appropriate to allow for visual and audio communication with the outer environment.

In some embodiments RGB LED notifier 118 is hidden behind front acrylic glass 122 but is viewable through front acrylic glass 122. In some embodiments RGB LED notifier 118 consists of multiple RGB LED's in differing configurations on varying surfaces of remote interaction device 100.

In the example embodiment front acrylic glass 122 is poly(methyl methracrylate) although in other embodiments other appropriate materials are used.

Turning to FIG. 2C, a rear view of remote interaction device 100 is shown with the back panel in place. In the example embodiment the back of remote interaction device 100 includes port 124, port cavity 126, power button 109, and mounting 130.

Port 124 in the example embodiment is a data port operable to receive data cable connectors. Although in the example embodiment port 124 is standardized to mini-USB cable connection size, in other embodiments port 124 is another connection size, such as micro-USB, standard USB, ethernet, or others.

Port cavity 126 in the example embodiment is a cavity which allows a connection cord, such as a mini-USB cord, to bend rather than connect directly out of the rear of remote interaction device 100. For instance, if remote interaction device is mounted to a wall by standard mounting 130, port cavity 126 provides a cavity in which a data cable can be connected to remote interaction device and the data cable may bend at a ninety degree angle so the back of remote interaction device 100 may remain flush with the wall. Port cavity 126 is deeper or shallower in various embodiments as required by the connector size to allow the device to remain flush with a wall while mounted.

Power button 109 is a power button in the example embodiment so as to allow a user to power remote interaction device on or off as required. In some embodiments power button 109 has additional capabilities such as a soft-reset after a three-second hold or others. In some embodiments power button 109 may be located on other surfaces of remote interaction device 100 such as the front, side, top, or bottom so as to facilitate ease of use for a user.

Standard mounting 130 is a mounting hole which is standardized so as to provide a mounting location for remote interaction device 100. In the example embodiment standard mounting 130 is a nail or screw type mounting, such as would be provided on the rear of a picture frame where the head of the nail or screw fits in the large hole and the body of the nail or screw rests in the slightly thinner location above the larger hole. In other embodiments standard mounting is another standardized type of mounting such as a speaker-type mounting, a threaded mounting to screw remote interaction device 100 in, or others.

Turning to FIG. 2D, a rear view of remote interaction device 100 is shown with the back panel removed. In this view, port cavity 126, antenna 130, and printed circuit board (PCB) 132 are visible.

Antenna 130 in the example embodiment is a Wi-Fi antenna which is capable of transmitting and receiving data signals over wireless network connected to the internet 116 which is a Wi-Fi network. In other embodiments other types of reception and transmission are capable over wireless network connected to the internet 116 including Bluetooth, 2G, 3G, 4G LTE, WiMAX or others.

PCB 132 is a printed circuit board which provides mechanical support and electrical connections for electrical components such as resistors, capacitors, processors, and others. In some embodiments PCB 132 includes a microprocessor, USB interface, memory, laser control interface, and wireless interface.

Turning to FIG. 2E, a bottom view of remote interaction device 100 is provided which shows port cavity 126 and soft silicon foot 134. Soft silicon foot 134 in the example embodiment is a soft silicon component which is attached to the bottom of remote interaction device 100 to allow remote interaction device 100 to have a higher friction coefficient than the metal or plastic housing of the device. As such, remote interaction device 100 is better able to rest in one place and has less likelihood of being pushed, pulled, or knocked off a supporting surface such as a table. Soft silicon foot 134 in the example embodiment is attached with glue to the bottom surface of remote interaction device 100 but in other embodiments, resins, epoxies, screws, nails, or other attachments are used.

In some embodiments multiple silicon feet 134 of varying dimensions and/or configurations are used to provide grip to supporting surfaces. For instance, two parallel strips are used in some embodiments while circular, square, triangular or other shapes are used in other embodiments.

Turning to FIG. 2F, a side view cutaway of remote interaction device 100 is provided which shows an example embodiment of component locations within casing 112 in remote interaction device 100.

Figure 3A:
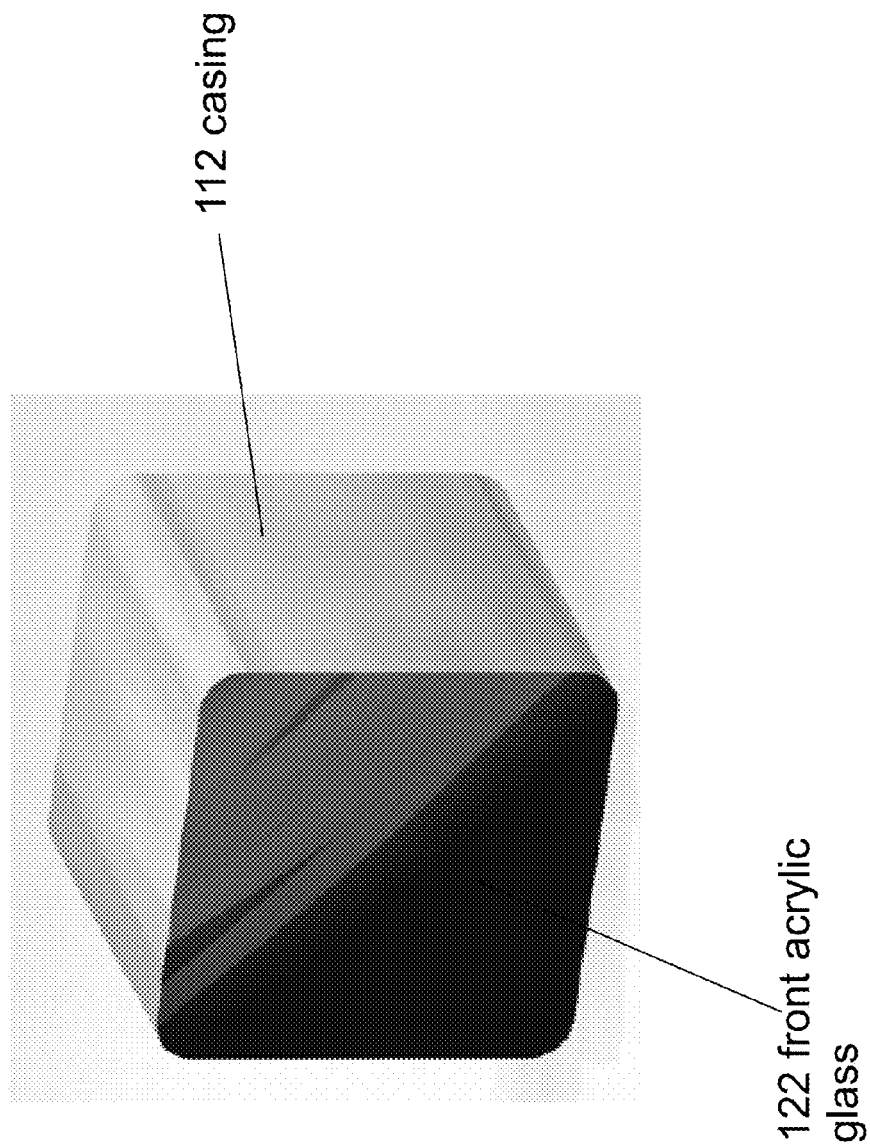
FIG. 3A is a perspective view of remote interaction device in accordance with the present invention.

Turning to FIG. 3A, an example embodiment of remote interaction device 100 is shown fully assembled.

Figure 3B:
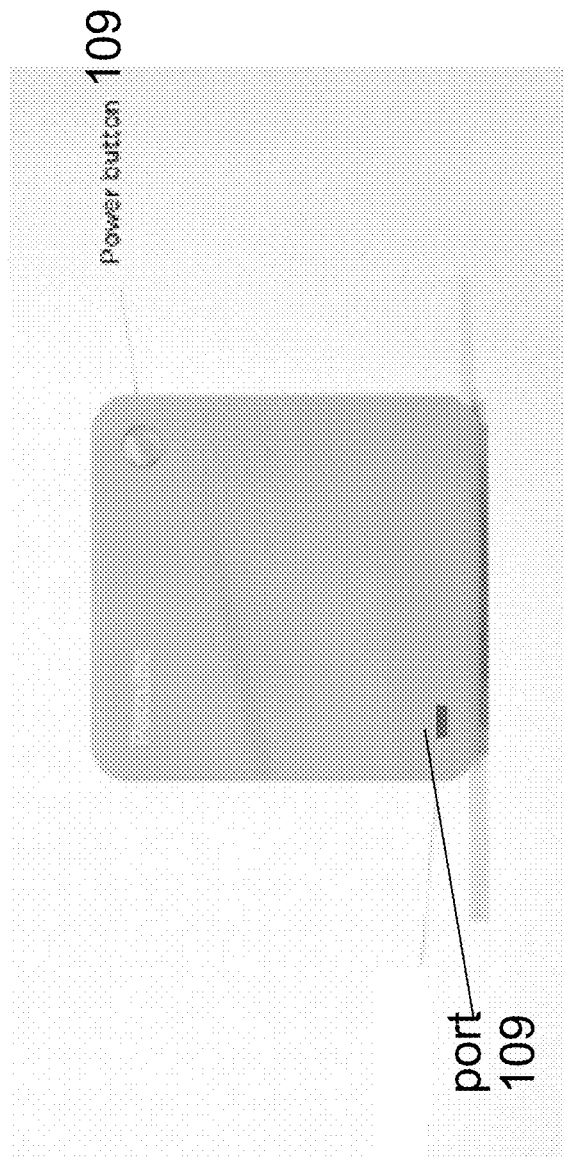
FIG. 3B is a view of the rear of remote interaction device in accordance with one alternative embodiment of the present invention.

Turning to FIG. 3B, an alternative example embodiment of remote interaction device 100 is shown from the rear in which port 109 is flush with the back of the device and no port cavity 126 is provided.

Figure 4:
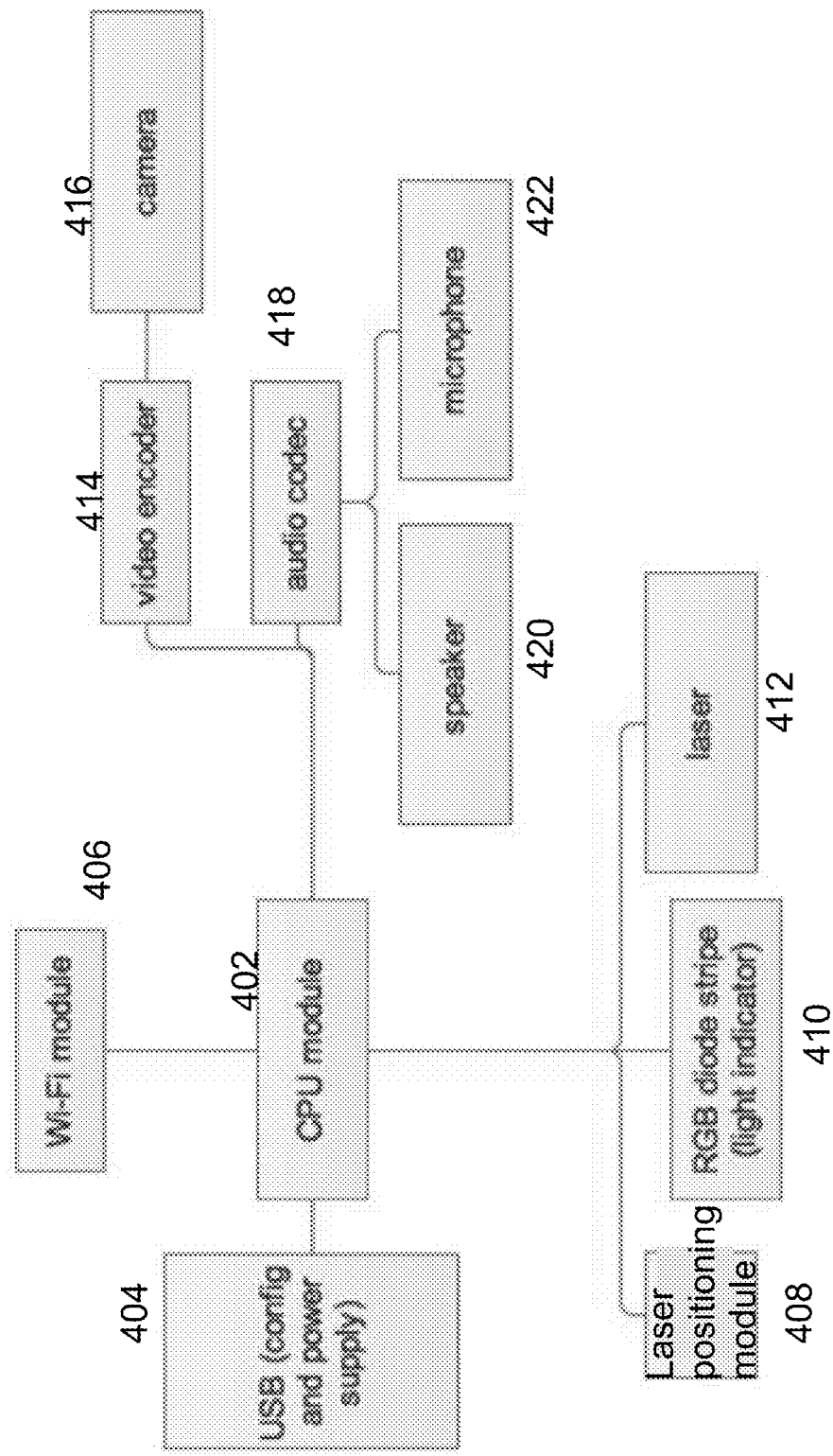
FIG. 4 is a diagram of various modules of the remote interaction device and their relation to one another in accordance with the present invention.

Turning to FIG. 4, a diagram of the device modules 400 of remote interaction device 100 is shown. As shown, CPU module 402 governs USB 404, Wi-Fi module 406, laser positioning module 408, RGB LED 410, laser 412, video codec 414, and audio codec 418. In turn audio codec 418 governs speaker 420 and microphone 422 and video encoder governs camera 416. In the example embodiment H.264 and AAC are used for video and audio encoding, STUN and TURN servers for NAT traversal, SIP for signaling and RTP is used for transport. A p2p connection is established between points which eliminates the need for a server to transport the video stream and allows for time to be saved, thus improving the live feeding capabilities. As required in various alternative embodiments additional processing units may be used and additional other modules may be added to provide increased functionality. Modules here should be understood to have broad functionality, such as laser positioning module 408 being operable in different embodiments to control electromagnets, servo-motors, or other laser positioning devices as required by the particular embodiment. Additionally, modules may govern more than one component, such as if multiple speakers are used.

Figure 5A:
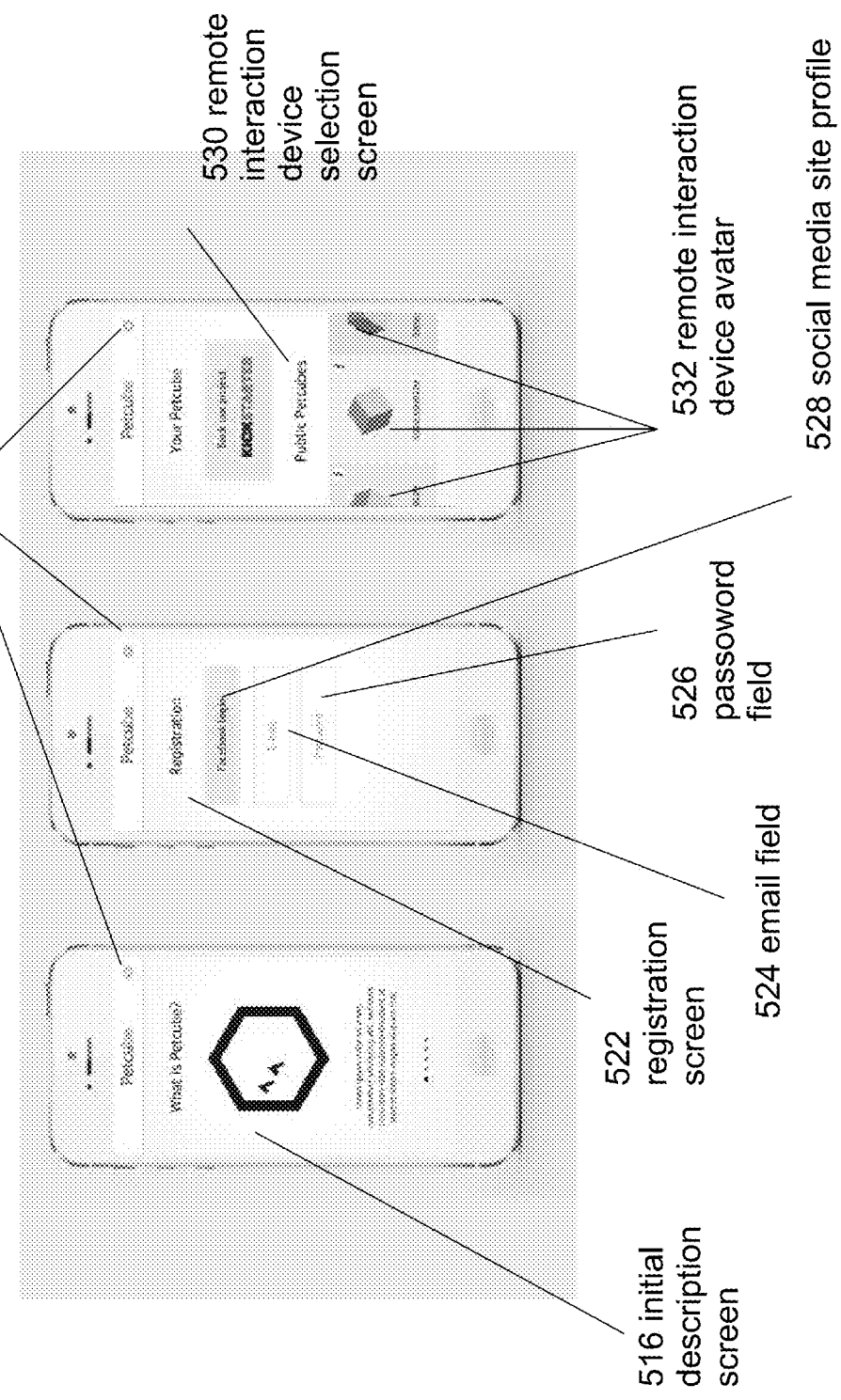
FIG. 5A is a visual portrayal of the first time setup of user interface to interact with remote interaction device in accordance with the present invention.

Turning to FIG. 5A, a user interface 500 is provided to operate on connected device 101.

When operator 114 first powers on remote interaction device 100 he must configure the device to communicate with wireless network connected to the internet 116. This is called first-time mode. In a typical first-time mode operator 114 receives data about the network name and password, if required. In the example embodiment connection is made by connecting remote interaction device 100 via USB interface to a computer. In alternative embodiments connection may be made by positioning a matrix or other two-dimensional barcode representing data in front of camera module 107 so camera module 107 may capture the matrix or other two-dimensional barcode. The data represented by the matrix or other two-dimensional barcode is then stored in the memory component of the CPU module 104 and used to connect to the network whenever needed. After completion of the first-time mode process, remote operation device 100 generally operates in normal operation mode.

FIG. 5A shows an example embodiment of several initial screens of user interface 500 which are displayed to operator 114 on connection device 101. Operator 114 need not be a remote interaction device 100 owner, operator 114 may be any person who wishes to interact with remote interaction device 100s. User interface 500 provides a way for operator 114s to navigate remote interaction device network 501. Initial description screen 516 may be first displayed by user interface 500 to welcome operator 114 and briefly describe remote interaction device and its capabilities. Selecting menu button 518 takes operator directly to a menu screen 520. After reading initial description screen 516 operator 114 is taken to a registration screen 522. Registration screen 522 allows operator 114 to register a new account or sign in to a previously registered account. Registration screen 522 in the example embodiment provides two methods of registration, by clicking a link to social media site profile 528 or by completing an email field 524 and password field 526. Operator 114 may then be shown remote interaction device selection screen 530 which shows numerous remote interaction device avatar 532s. Choosing remote interaction device avatar 532 will take operator 114 directly to interaction screen 550 unless a queue has formed, described below in this application.

Figure 5B:
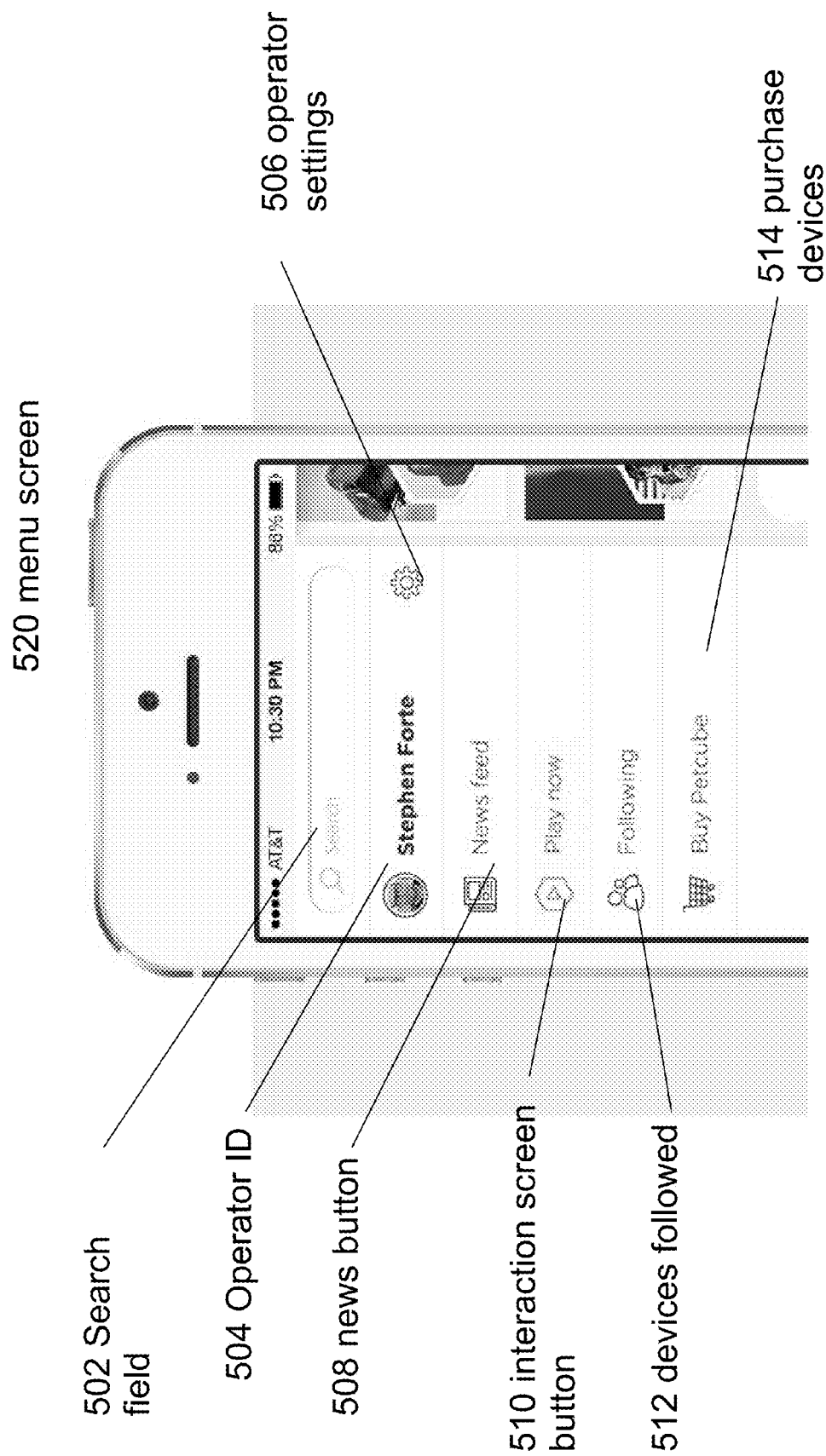
FIG. 5B is a visual portrayal of the typical user interface to interact with a menu screen associated with remote interaction device including search capabilities in accordance with the present invention.

Turning to FIG. 5B, normal operation mode allows operator 114 to navigate the device network and control remote interaction device 100 via connected device 101 over the internet. Operator 114 controls remote interaction device 100 using a user interface 500 such as that shown in FIG. 5A-5F. User interface 500 may require or allow for sign in using various social networks to link to the device network.

Numerous fields are provided in menu screen 520 of user interface 500. In the example embodiment various buttons and fields allow navigation to different parts of the device network. In the example embodiment these include search field 502, operator ID 504, operator settings 506, news 508, interaction screen button 510, devices followed 512, and purchase devices 514. In other embodiments additional or fewer buttons and/or fields are provided.

Search field 502 allows operator 114 to search for remote interaction device 100s or other operators on the site by name, description, or other identifier such as Operator ID 504.

Operator ID 104 is the name or alias provided by operator 114 when signing into the remote interaction device network 501.

News button 508 takes operator 114 to news screen 560.

Interaction screen button 510 takes operator 114 to interaction screen 550.

Devices followed 512 takes operator 114 to a list of devices which operator 114 has elected to follow.

Operator settings 506 takes operator 114 to a list of settings and/or preferences. Operator settings 506 may include various personal preferences for operator 114 including when to turn remote interaction device on or off remotely, contact capabilities for other operators, lists of operators blocked from interacting with operator 114's remote interaction device 100, or others.

Purchase devices 514 allows operator 114 to purchase remote interaction device 100s.

Normal operation mode is the general mode which allows operator 114 to navigate remote interaction device network 501. In the example embodiment this includes search and browse capabilities to find pet 111's using remote interaction device 100's that operator 114 finds interesting, entertaining, or otherwise needing interaction. Search field 502 provides one way of finding other devices.

Figure 5C:
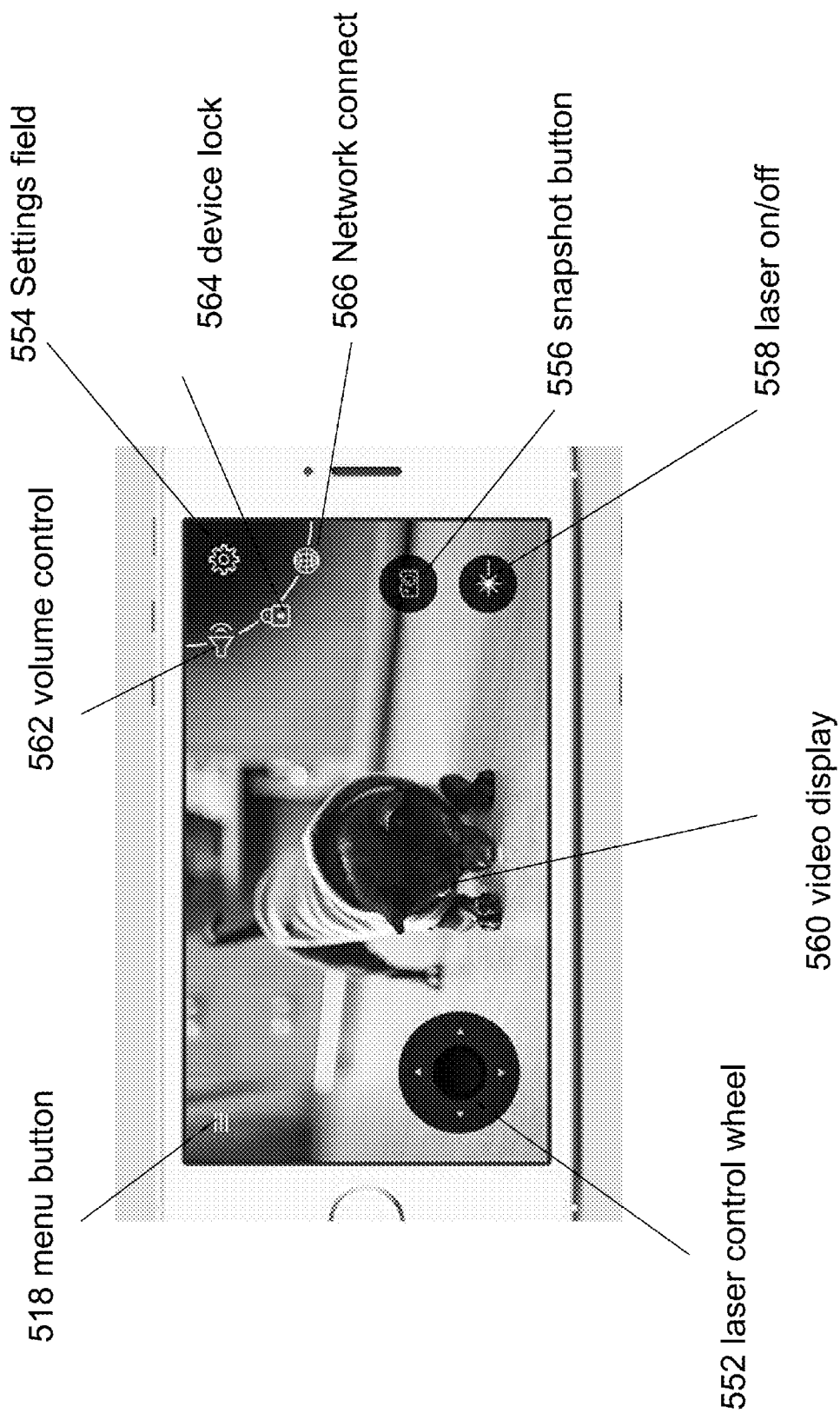
FIG. 5C is a visual portrayal of the typical user interface to interact with remote interaction device in accordance with the present invention.

Turning to FIG. 5C, an example embodiment of interaction screen 550 is shown. In the example embodiment several fields and buttons are shown. These fields and buttons include menu button 518, laser control wheel 552, settings field 554, volume control 562, device lock 564, network connect 566, snapshot button 556, laser on/off 558, and video display 560.

Menu button 518 provides operator the ability to go to menu screen 520.

Laser control wheel 552 provides operator 114 the ability to control laser beam positioning device 600 of remote device 100 and project laser beam 110 to a desired location.

Settings field 554 provides operator 114 the ability to minimize settings and/or select additional settings.

Volume control 562 provides operator 114 the ability to turn volume up, down or mute on remote interaction device 100 and/or connected device 101.

Device lock 564 provides operator 114 the ability to lock remote interaction device 100 and/or connected device 101.

Network connect 566 provides operator 114 the ability to connect current remote interaction device 100 to other remote interaction device 100s.

Snapshot button 556 provides operator 114 the ability to take a snapshot picture of the current display of video display 560.

Laser on/off 558 provides operator 114 the ability to turn remote interaction device 100's laser on or off.

Video display 560 shows a video display of remote interaction device 100 to which operator 114 is currently connected.

Figure 5D:
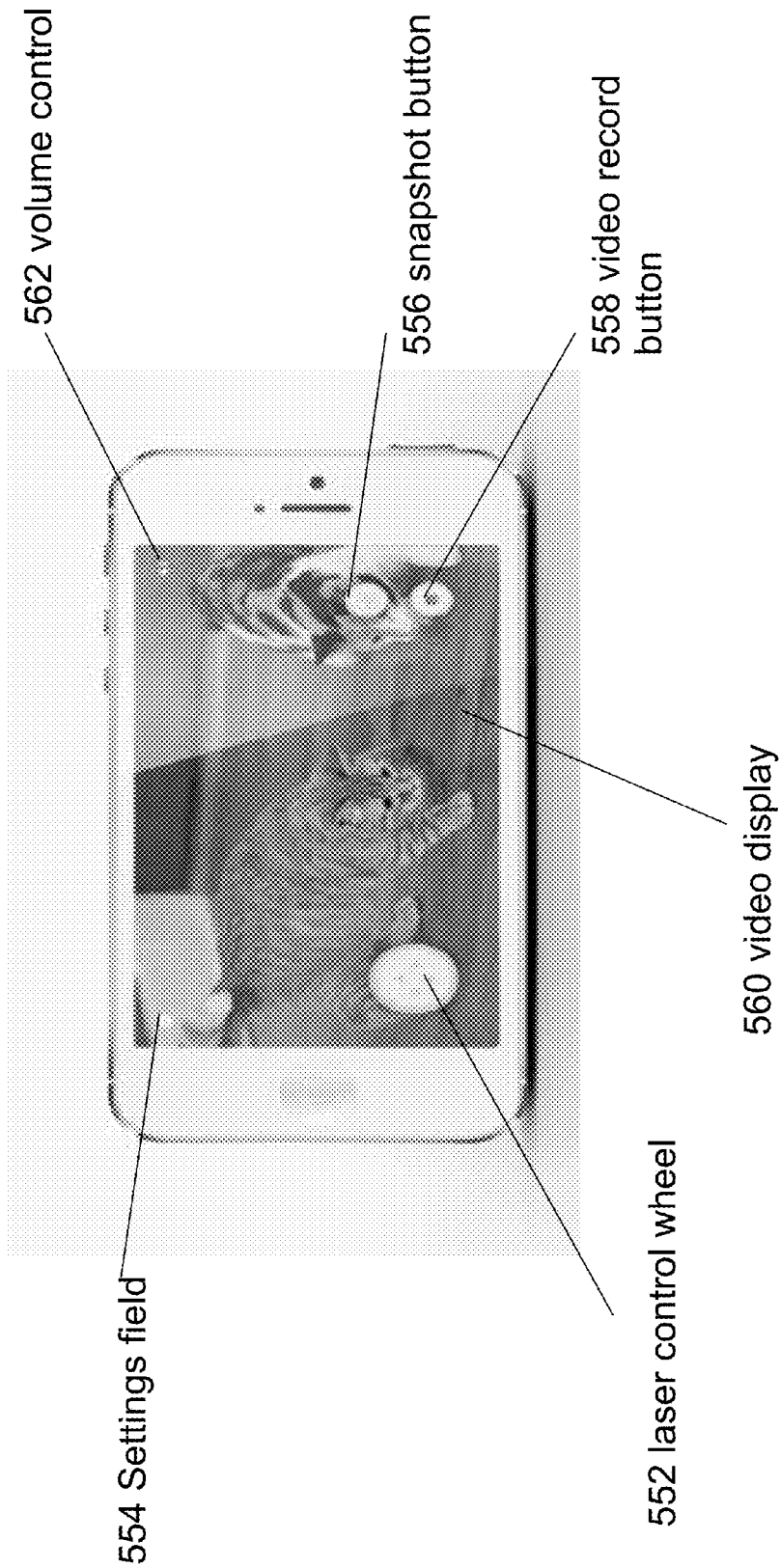
FIG. 5D is a visual portrayal of the user interface to interact with remote interaction devices in accordance with the present invention.

Turning to FIG. 5D, another embodiment of interaction screen 550 is shown.

In this embodiment several features are omitted or minimized. Also provided for are video record button 558.

In some embodiments operator 114 may choose what buttons or fields appear on interaction screen 550.

In some embodiments viewing live or delayed streaming video from camera module 107 is possible. In some embodiments operator 114 hears audio from remote interaction device 100's location captured by microphone 108. In some embodiments operator captures sound from operator 114's environment using a local microphone compatible and operably connected to connected device 101 to transmit audio to be played over speaker 106 at remote interaction device 100's location.

Figure 5E:
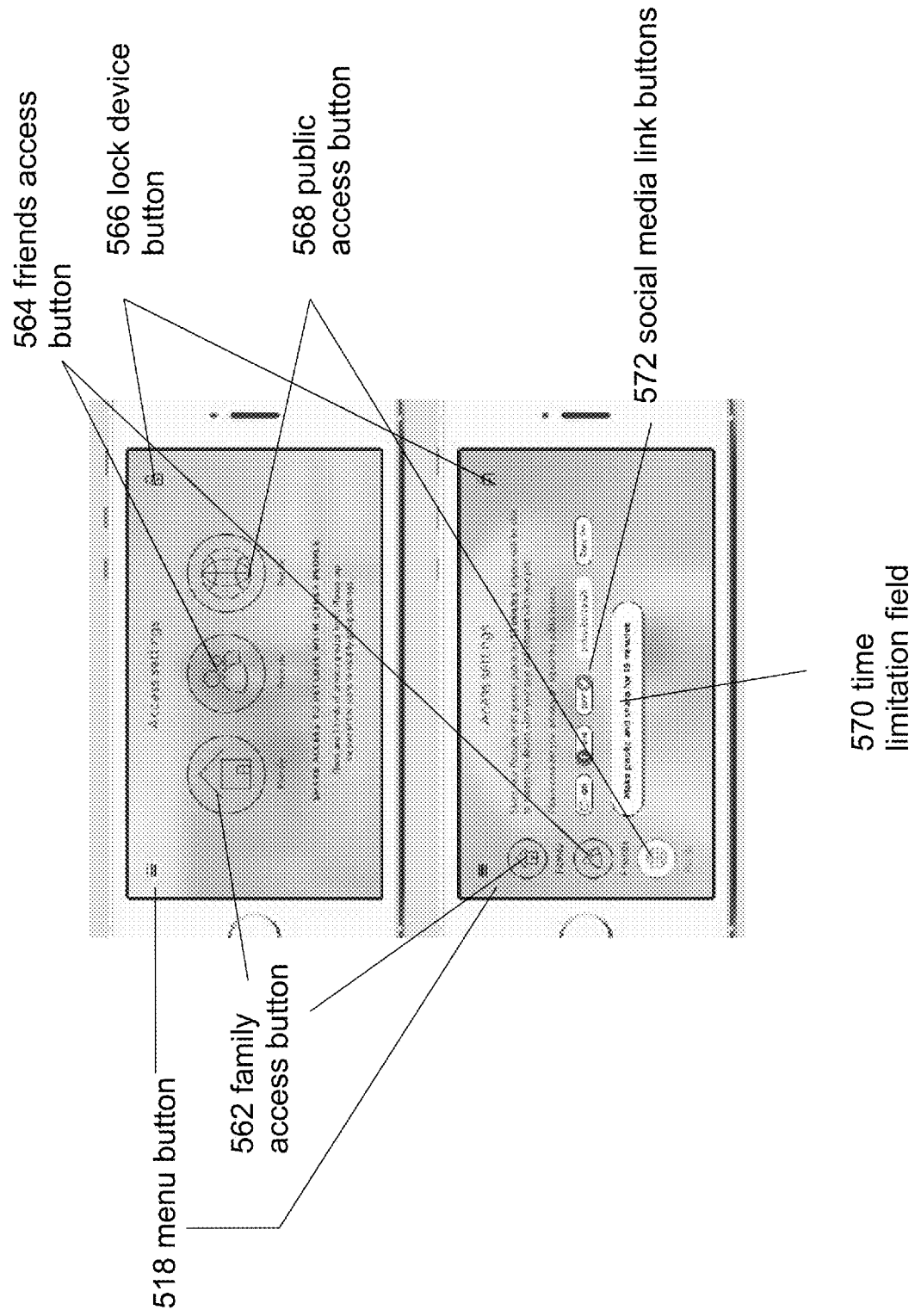
FIG. 5E is a visual portrayal of the user interface to set interaction capabilities for a remote interaction device for other users in accordance with the invention.

Turning to FIG. 5E, access settings screen 560 is provided which allows operator 114 to set access preferences for remote interaction device 100 which is linked to remote interaction device network 501. In some instances, operator 114 may wish to limit the potential group of operator 114s which can access remote interaction device 100.

In the example embodiment operator 114 may choose one or more categories which he may share interaction with remote interaction device 100 over the device network. In the example embodiment three categories are provided which are family, friends, and general public. Each has a corresponding button including family access button 562, friends' access button 564, and public access button 568. In some embodiments the family category allows members of a single household to interact with pet 111 using remote interaction device 100 at any time. In some embodiments the friends category allows friends of operator 114 to interact with pet 111 using remote interaction device 100 during hours specified by operator 114. In some embodiments the general public category allows members of the public to interact with pet 111 using remote interaction device 100 for a period of time specified by operator 114, for instance fifteen minutes. Time limitation field 570 allows operator 114 to select an amount of time for interaction.

Lock device button 566 provides operator the ability to lock remote interaction device 100 access settings.

Also provided in FIG. 5E on access settings screen 560 are social media link buttons 572. Social media link buttons 572 allow operator 114 a convenient way to post on other social media platforms about remote interaction device 100. In some embodiments utilizing social media link buttons may allow "followers", "friends", or other contacts associated with operator 114's social media profiles on other platforms to access remote interaction device 100 or operator 114 to import those other contacts.

Figure 5F:
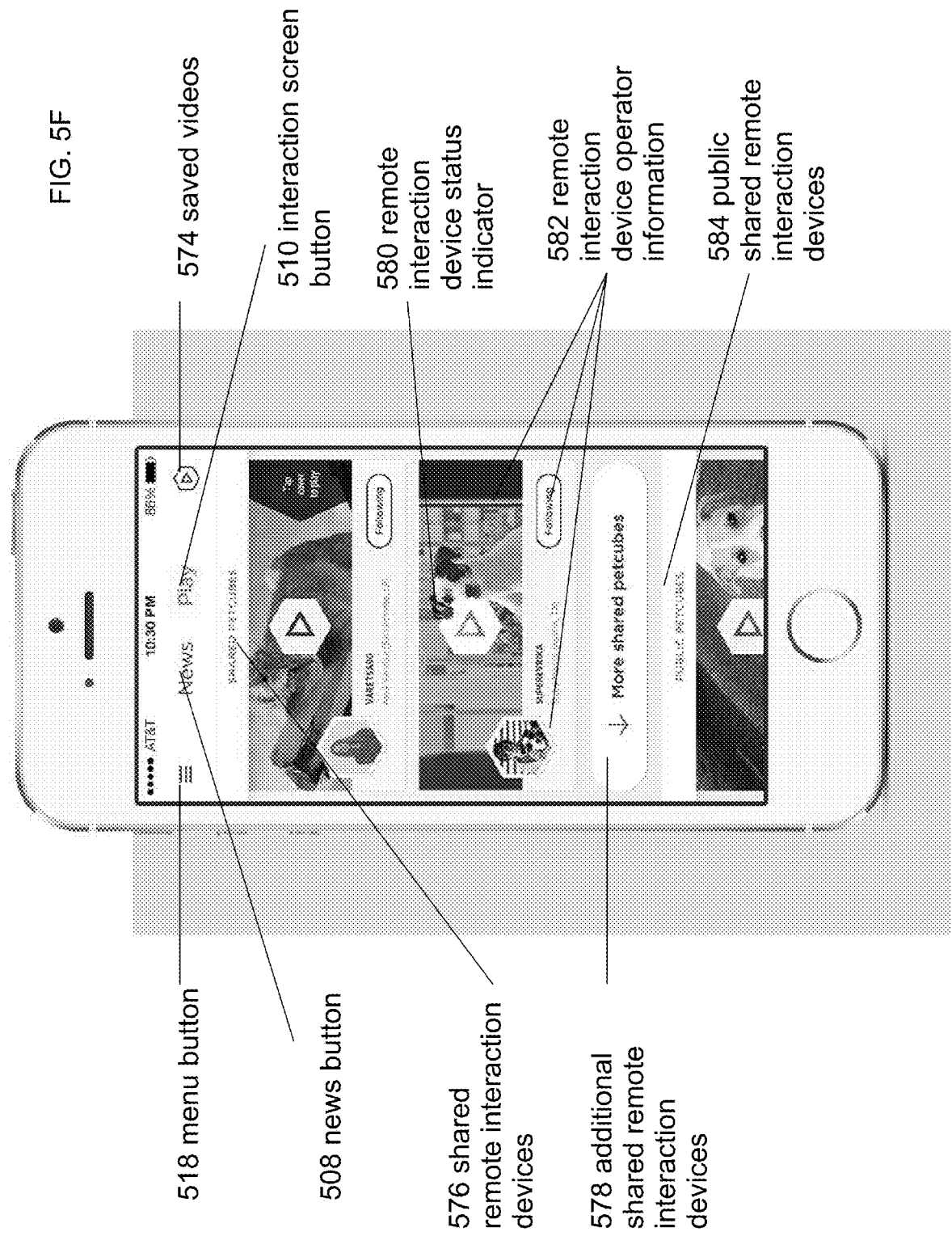
FIG. 5F is a visual portrayal of the user interface to view saved remote interaction devices and browse new remote interaction devices to interact with in accordance with the present invention.

Turning to FIG. 5F, another screen in user interface 500 is shown. Various fields are shown in this embodiment including menu button 518, news button 508, shared remote interaction devices 576, additional shared remote interaction devices 578, saved videos 574, interaction screen button 510, remote interaction device status indicator 580, remote interaction device operator information 582, and public shared remote interaction devices 584. In other embodiments more or less information may be provided onscreen.

Shared remote interaction devices 576 includes a list of shared remote interaction devices between family and friends or other connected remote interaction device 100 operators 114.

Additional shared remote interaction devices 578, provides access to additional shared remote interaction device 100s if the list is truncated to save space in user interface 500.

Saved videos 574, may take operator 114 to a list of saved videos.

Interaction screen button 510 is provided to take user to interaction screen 550.

Remote interaction device status indicator 580 is provided to show operator 114 the status of a remote interaction device 100. Different colors or flashes may indicate that remote interaction device 100 is currently in use, needs attention, has a queue, or otherwise signifies another useful status.

Remote interaction device operator information 582 in the example embodiment provides brief information about operator 114 of a remote interaction device 100 and a link to information about operator 114's profile which may include pet names, user names, avatar pictures, location information or others.

Public shared remote interaction devices 584 provides a list of public remote interaction device 100s which may be interesting in some embodiments or in other embodiments may provide random browsing through public remote interaction device 100s.

In some embodiments operator 114 may share access to his remote interaction device 100 with another operator 114 based on their relationship or other interest in pet 111. In some embodiments operator 114 may share access to his remote interaction device 100 with the general public.

Turning to FIG. 5G, another embodiment of user interface 500 is shown. In this example embodiment operator profile 599 is shown. In the example embodiment numerous elements are shown including menu button 518, operator ID 504, operator picture 586, operator follow 588, operator news 590, saved videos 574, avatar 592, remote interaction device operator information 582, operator interaction button 594, story type indicator 596, and others.

Operator follow 588 provides operator 114 a way to receive news and facilitate interaction by keeping operator profile 599 in a convenient location such as a list of friends or acquaintances.

Operator news 590 displays information which the owner of operator profile 599 has published. In various embodiments this includes pictures, videos, comments, sounds, and other news.

Avatar 592 provides operator with a picture identifying remote interaction device 100.

Remote interaction device operator information 582, may include more information than that shown in FIG. 5F including length of time owning remote interaction device 100, comments, quotes, preferences or others.

Operator interaction button 594 provides operator 114 a way of interacting with operator profile 599 such as leaving a private message, a public message, sending pictures or videos or others.

Story type indicator 596 indicates the type of story published in news screen 560 or elsewhere. For example story type indicator may show a camera icon to signify a picture, a camcorder icon to signify a video, a memo icon to signify a comment, or others.

Figure 5H:
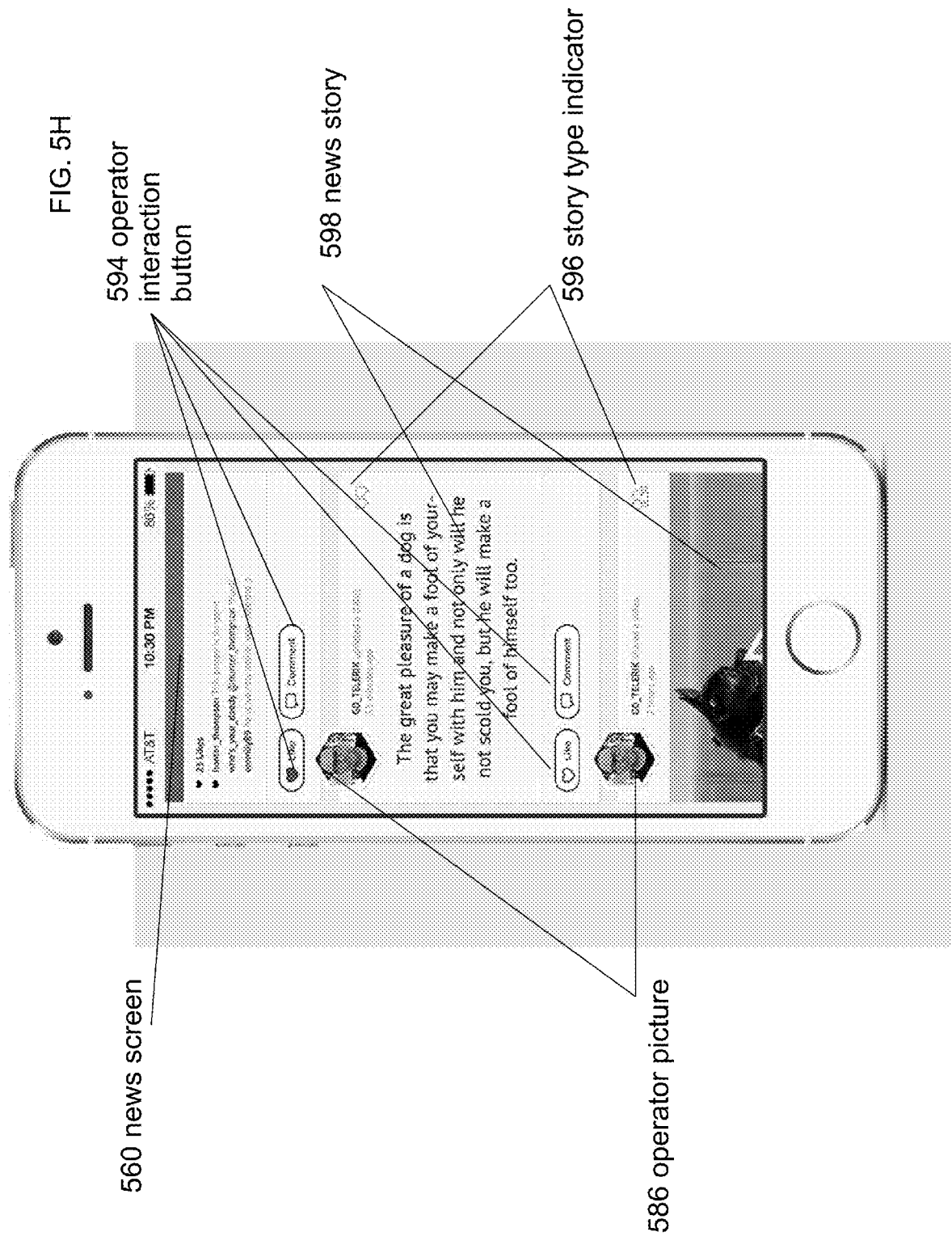
FIG. 5H is a visual portrayal of the user interface to interact with a news screen associated with remote interaction devices and operators in accordance with the present invention.

Turning to FIG. 5H, news screen 560 is shown as part of user interface 500. Remote interaction device network 501 includes news screen 560 to interact with other operator 114s by publishing comments, videos, or other content to the device network. This information is published under news 508.

In some embodiments operator 114's may connect to the device network and use it without owning a remote interaction device 100. This allows individuals who do not have pets to interact with remote interaction device 100's and share their love for animals and friendship with other operator 114's.

In some embodiments multiple operator 114's may wish to interact with a single remote interaction device 100. In some embodiments a queue is formed on the network and a time limit is imposed on a current interaction based on the time already elapsed in the current interaction, the length of time waiting in the queue by the next operator 114, the number of additional operator 114's in the queue, or other qualifications.

In some embodiments remote interaction device 100 may be connected with other remote interaction device 100's to provide a home network or multi-device setup for operator 114. This is useful in locations which may have multiple rooms or environments in which pet 111 may be located such as a multi-room home or a home with a backyard patio. In these embodiments operator 114 has the ability to switch his view between remote interaction device 100's to locate pet 111. In some embodiments an image recognition system detects pet 111 to save operator 114 time in locating pet 111.

In the example embodiment video recording using camera module 107 can be saved in local storage in remote interaction device 100. This allows operator 114 to transfer the recording to other storage, such as cloud storage, at a later time. This provides operator 114 the ability to capture a high quality video without large bandwidth requirements for streaming the video.

In some embodiments remote interaction device 100 may be connected with other devices which are not other remote interaction device 100's. In such cases, an appropriate application programming interface (API) is required to govern how software components interact with each other. In some embodiments other devices may include home appliances such as lighting, audio-visual output devices such as music players, televisions, or computer monitors, pet toys, feeding devices, collars, and other electronics with appropriate wireless connectivity. The wireless connectivity between remote interaction device 100 may be the same which is used to connect remote interaction device 100 to the internet such as Wi-Fi or it may be different such as Bluetooth or others.

Figure 6A:
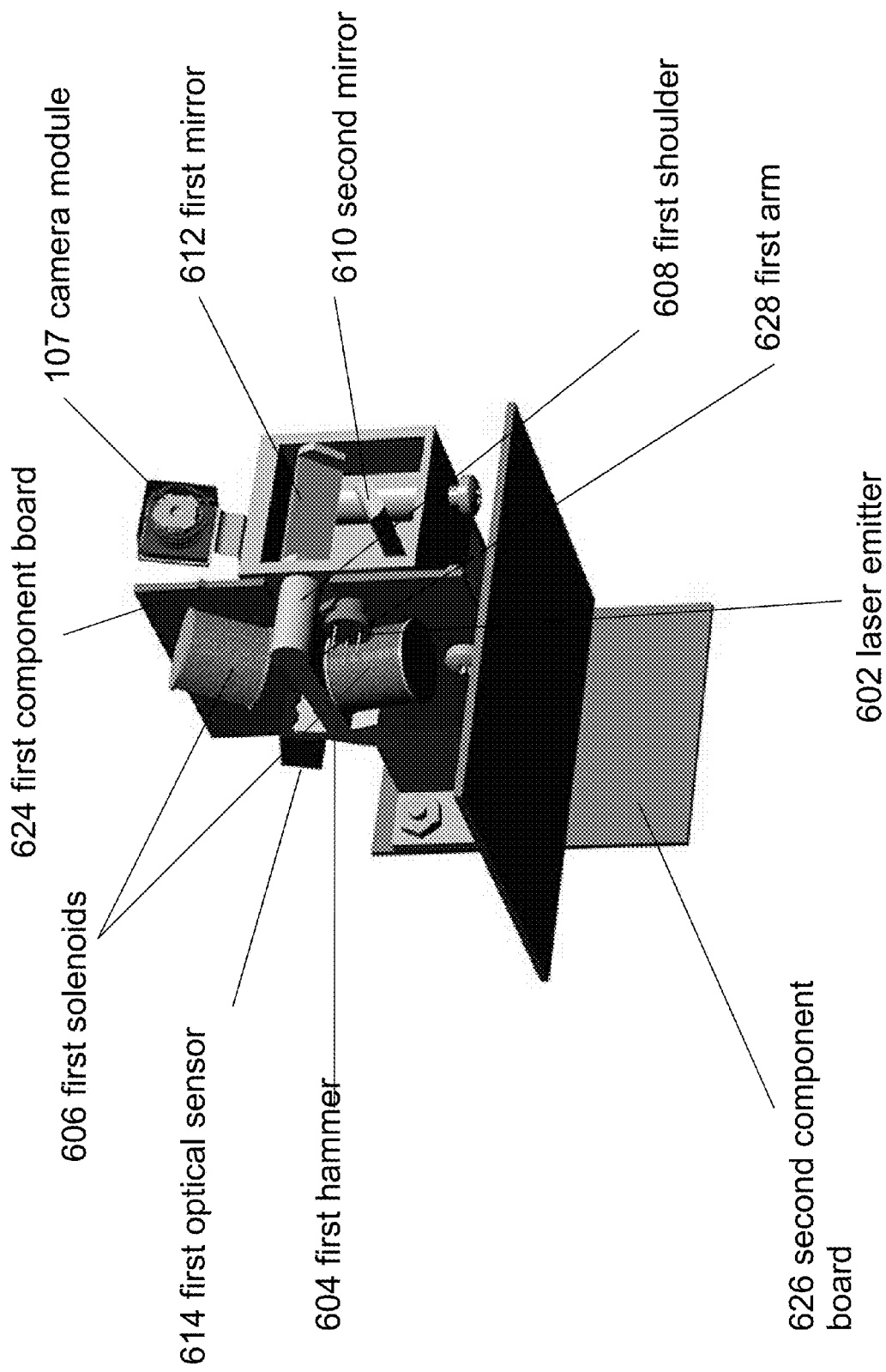
FIG. 6A is a diagram of a laser positioning device showing an angular perspective of a laser beam positioning device in accordance with the present invention.
Figure 6B:
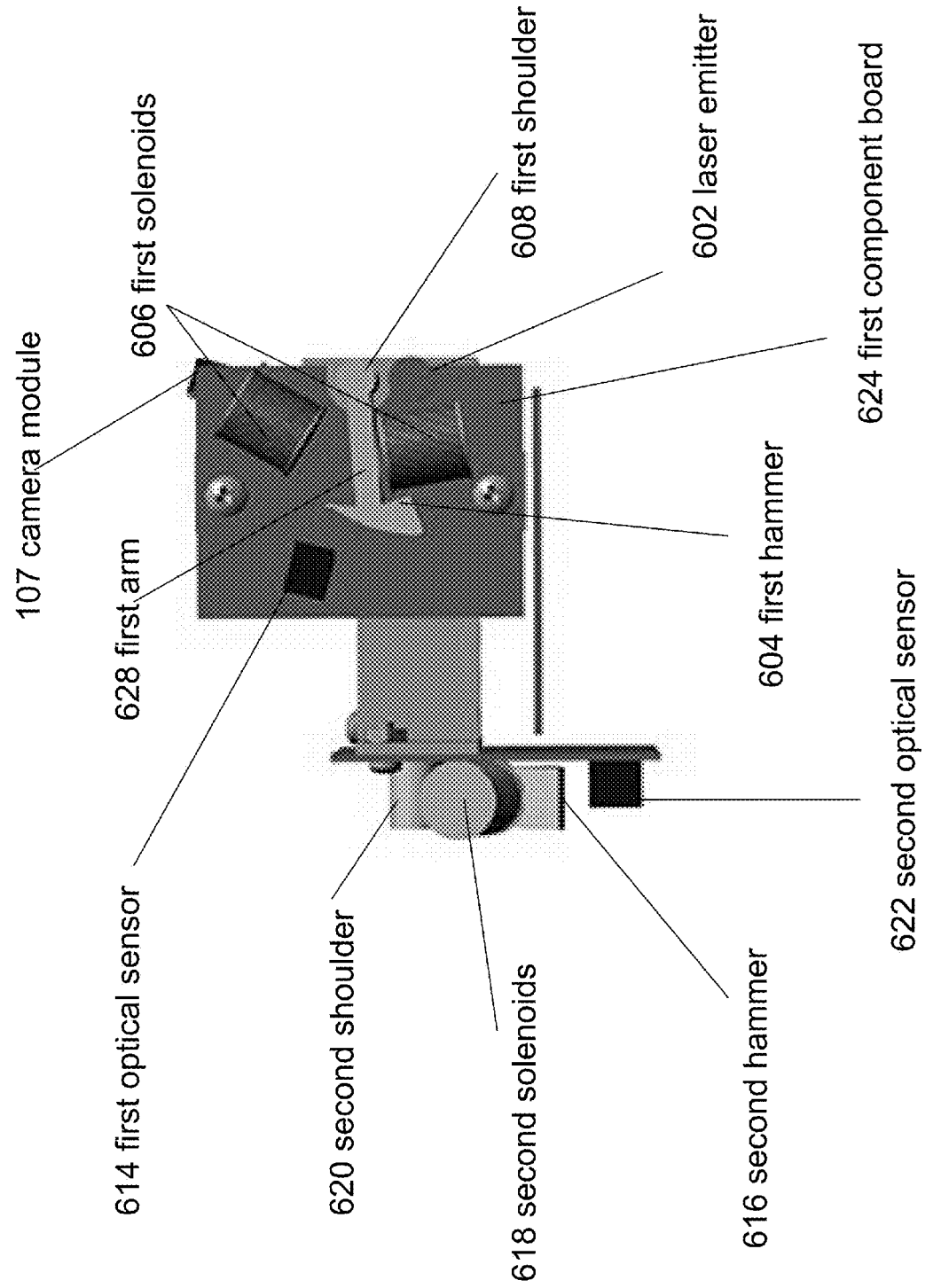
FIG. 6B is a diagram of a side perspective of a laser beam positioning device in accordance with the present invention.

Turning to FIGS. 6A-6E, an example embodiment of laser beam positioning device 600 is shown in differing perspective views. FIG. 6A shows an angular perspective of laser beam positioning device 600. FIG. 6B shows a side perspective of laser beam positioning device 600. FIG. 6C shows a front perspective of laser beam positioning device 600. FIG. 6D shows the side perspective view of laser beam positioning device 600 from the opposite side of FIG. 6B. FIG. 6E shows a rear perspective view of laser beam positioning device 600.

In the example embodiment shown in FIGS. 6A-6E numerous components are shown which relate to laser beam positioning device 600. Generally there is a first group of components which control horizontal movement of laser beam 110 and a second group of components which control vertical movement of laser beam 110. Components generally used in controlling vertical movement of laser beam 110 are given the "first" designation such as first hammer 604, first optical sensor 614, first solenoids 606, first shoulder 608, first arm 628, and first mirror 612 which are mounted to first component board 624. Components generally used in controlling horizontal movement of laser beam 110 are given the "second" designation such as second hammer 616, second optical sensor 622, second solenoids 618, second shoulder 620, second arm 630, and second mirror 610 which are mounted to second component board 626. Additional components required for laser beam 110 control include laser emitter 602 which is mounted to first component board 624. Additional or fewer components are used in some embodiments to control laser beam 110.

In the example embodiment laser emitter 602 emits a laser which is reflected from second mirror 610 to first mirror 612 which then reflects the laser beam to through front acrylic glass 122 and into the environment in front of remote interaction device 100, generally to a surface such as a floor, a wall, a ceiling, a furniture surface, or others.

First mirror 612 has a flat reflective surface and is mounted to or manufactured as part of first shoulder 608. First shoulder 608 is a rod component which has an axis of rotation running through its center. First shoulder 608 is connected to first arm 628. First arm 628 is attached to first hammer 604 at its end opposite of first shoulder 608. The center of first arm 628 has a permanent neodymium magnet in it with magnetic poles. The magnetic poles of this permanent neodymium magnet are directed perpendicularly to the rotational movement directions of first arm 628 when first arm 628 is rotated about rotational axis at the center of first shoulder 608. First shoulder 628 passes through first component board 624 so that first mirror 612 is on the opposite side of first component board 624 from first arm 628 and first hammer 604. The hole through which first shoulder 608 passes through first component board 624 allows for rotation of first shoulder 608 within the hole. First solenoids 606 are mounted on the same side of first component board that 624 first arm 628 and first hammer 604 are located.

First solenoids 606 are in electrical communication with a power supply such as a battery or other power source. First solenoids 606 control rotation of first arm 628 and thus the movement of first mirror 612 by creating a magnetic field which in the example embodiment repels the magnetic poles of the permanent neodymium magnet at the center of first arm 628. Fine-tuned control of the rotation of first arm 628 is controlled by varying the amount of electrical current passed through each of first solenoids 606. A controller such as the central processing unit of remote interaction device 100 controls the amount of current passed through each of first solenoids 606 based on the control instructions received from connected device 101 operated by operator 114.

First optical sensor 614 is mounted to the same side of first component board 624 as first solenoids 606. First optical sensor 614 in the example embodiment has two components, a light emitter and a light detector. In the example embodiment, at a central positioning of first hammer 604 and first arm 628 light detector of first optical sensor 614 detects a maximum luminous flux of light emitted from light emitter of first optical sensor 614 and reflected off first hammer 604. As the location of first hammer 604 changes when laser beam positioning device 600 is in use, light receiver of first optical sensor 614 continues to monitor the luminous flux of light reflected off first hammer 604 and thus monitors and provides calibration information for laser beam positioning device 600. This form of feedback is beneficial because it provides information about whether one direction of laser beam positioning device 600 is operating properly.

Second mirror 610 has a flat reflective surface and is mounted to or manufactured as part of second shoulder 620. Second shoulder 620 is a rod component which has an axis of rotation running through its center. Second shoulder 620 is connected to second arm 630. Second arm 630 is attached to second hammer 616 at its end opposite of second shoulder 620. The center of second arm 616 has a permanent neodymium magnet in it with magnetic poles. The magnetic poles of this permanent neodymium magnet are directed perpendicularly to the rotational movement directions of second arm 630 when second arm 630 is rotated about rotational axis at the center of second shoulder 620. Second shoulder 620 passes through second component board 626 so that second mirror 610 is on the opposite side of second component board 626 from second arm 630 and second hammer 616. The hole through which second shoulder 620 passes through second component board 626 allows for rotation of second shoulder 620 within the hole. Second solenoids 618 are mounted on the same side of second component board 626 that second arm 630 and second hammer 616 are located.

Second solenoids 618 are in electrical communication with a power supply such as a battery or other power source. Second solenoids 618 control rotation of second arm 630 and thus the movement of second mirror 610 by creating a magnetic field which attracts or repels the magnetic poles of the permanent neodymium magnet at the center of second arm 630. Fine-tuned control of the rotation of second arm 630 is controlled by varying the amount of electrical current passed through each of second solenoids 618. A controller such as the central processing unit of remote interaction device 100 controls the amount of current passed through each of second solenoids 618 based on the control instructions received from connected device 101 operated by operator 114.

Second optical sensor 622 is mounted to the same side of second component board 626 as second solenoids 618. Second optical sensor 622 in the example embodiment has two components, a light emitter and a light detector. In the example embodiment, at a central positioning of second hammer 616 and second arm 630 light detector of second optical sensor 622 detects a maximum luminous flux of light emitted from light emitter of second optical sensor 622 and reflected off second hammer 616. As the location of second hammer 616 changes when laser beam positioning device 600 is in use, light receiver of second optical sensor 622 continues to monitor the luminous flux of light reflected off second hammer 616 and thus monitors and provides calibration information for laser beam positioning device 600. This form of feedback is beneficial because it provides information about whether one direction of laser beam positioning device 600 is operating properly.

FIG. 6D shows the best perspective for viewing laser support structure 634. Laser support structure 634 provides an overall support structure for the components in laser beam positioning device 600. Laser support structure 634 generally provides mounting locations for first component board 624 and second component board 626. In the example embodiment first component board 624 and second component board 626 are in perpendicular planes. As such, first shoulder 608 and second shoulder 620 are in perpendicular planes to one another and provide optimal orientation for reflection of laser beam 110 emitted by laser emitter 602 off second mirror 610 to first mirror 612 and off first mirror 612 to the outside environment.

In the example embodiment camera module 107 is also affixed to laser support structure 634. In other embodiments camera module 107 is located in other locations within remote interaction device 100 and is not affixed to laser support structure 634.

In some embodiments remote interaction device 100 provides structure for operator 114 to save inputted commands such as for the laser beam positioning device 600 when operator 114 deems it necessary or desirable. These saved commands may include a particular sequence of movements. Operator 114 may deem it necessary or desirable to save commands when a particular set or sequence of laser beam 110 movements please pet 111, cause it to do a trick, or an otherwise desirable response such as a positive response occurs.

In some embodiments there is an auto-play mode which allows operator 114 to record a set of laser and voice commands. Operator 114 may then set a time for remote interaction device 100 to interact with pet 111 automatically.

While embodiments of the present invention have been shown and described, various modifications may be made without departing from the spirit and scope of the present invention, and all such modifications and equivalents are intended to be covered.

In many instances entities are described herein as being coupled to other entities. It should be understood that the terms "coupled" and "connected" (or any of their forms) are used interchangeably herein and, in both cases, are generic to the direct coupling of two entities (without any non-negligible (e.g., parasitic) intervening entities) and the indirect coupling of two entities (with one or more non-negligible intervening entities). Where entities are shown as being directly coupled together, or described as coupled together without description of any intervening entity, it should be understood that those entities can be indirectly coupled together as well unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A remote pet interaction device comprising:
  a case having an inside, an outside, a front wall and a back wall;
  an audio-visual platform operable to record audiovisual data about the environment, wherein the audio-visual platform includes a digital camera housed within the case with a lens exposed within the front wall to capture a pet's movement;
  a laser beam pointer exposed within the front wall to emit a laser beam against a surface to form a light-based spot located to capture the pet's attention;
  a pan and tilt platform within the case and coupled to the laser beam pointer to mechanically control the location of the light-based spot, wherein the pan and tilt platform includes an electromagnetics-based control system that includes:
    a vertically rotating arm coupled to a first magnet at a center of the vertically rotating arm,
    a first pair of solenoids, one located on each side of the vertically rotating arm to control the vertically rotating arm's rotation and the laser beam pointer's vertical movement,
    a horizontally rotating arm coupled to a second magnet at a center of the horizontally rotating arm,
    a second pair of solenoids, one located on each side of the horizontally rotating arm to control the horizontally rotating arm's rotation and the laser beam pointer's horizontal movement,
  at least one optical sensor positioned to detect a maximum luminous flux of light emitted from the laser beam pointer;
  a speaker within the case to emit sound to capture the pet's attention and convey voice commands;
  a wireless transceiver, within the case, operable to send and receive data including the audiovisual data, digital sound for the speaker, and commands for controlling the pan and tilt platform;
  a processor operable to process data from the audio-visual platform, the wireless transceiver, and a data and power platform;
  a non-transitory computer readable medium with instructions that, when executed by the processor, causes said processor to:
    enable multiple users to access and control the remote pet interaction device via a social media system, wherein the multiple users fall into a plurality of categories within the social media system, and the multiple users may be selected based on a respective category, and
    post streaming videos from the audio-visual platform to the social media system; and
  the data and power platform operable to receive data from a computer when connected, and provide power to all device components including the audio-visual platform, the laser beam pointer, the pan and tilt platform, the speaker, the wireless transceiver, and the processor.

2. The remote pet interaction device according to claim 1, wherein the wireless transceiver further comprises a wireless controller and an antenna operable to send and receive data transmission signals to and from the wireless controller.

3. The remote pet interaction device according to claim 1, wherein the audio-visual platform further comprises at least one video recorder and at least one acoustic transducer.

4. The remote pet interaction device according to claim 1, wherein the data and power platform further comprises a data port which also serves as a power supply.

5. A remote pet interaction system comprising:
  a case having an inside, an outside, a front wall and a back wall;
  a multimedia recording system operable to record audio data and visual data at a first location, wherein the multimedia recording system includes a digital camera housed within the case with a lens exposed within the front wall to capture a pet's movement;
  a laser beam pointer exposed within the front wall to emit a laser beam against a surface to form a light-based spot located to capture the pet's attention;
  a pan and tilt platform within the case and coupled to the laser beam pointer to mechanically control the location of the light-based spot, wherein the pan and tilt platform includes an electromagnetics-based control system that includes:

a vertically rotating arm coupled to a first magnet at a center of the vertically rotating arm,
a first pair of solenoids, one located on each side of the vertically rotating arm to control the vertically rotating arm's rotation and the laser beam pointer's vertical movement,
a horizontally rotating arm coupled to a second magnet at a center of the horizontally rotating arm,
a second pair of solenoids, one located on each side of the horizontally rotating arm to control the horizontally rotating arm's rotation and the laser beam pointer's horizontal movement,
at least one optical sensor positioned to detect a maximum luminous flux of light emitted from the laser beam pointer;
a speaker within the case to emit sounds to capture the pet's attention and convey voice commands;
a transmission and reception system operable to transmit and receive data from the first location including the audio data and visual data;
a remote monitoring device having a processor and a non-transitory computer-readable medium containing a sequence of instructions that, when executed by the processor, causes the remote monitoring device to enable a user at a second location to perform the following functions:
receive and play the audio data and visual data from the first location,
transmit sound to be sent to the speaker,
control the pan and tilt platform,
enable multiple users to access and control the remote pet interaction device via a social media system, wherein the multiple users fall into a plurality of categories within the social media system, and the multiple users may be selected based on a respective category, and
post streaming videos from the audio-visual platform to the social media system.

6. A remote pet interaction system according to claim 5, wherein the multimedia recording system recognizes audible or visual movement at the first location and notifies a user at the second location.

7. A remote pet interaction system according to claim 5, wherein the remote monitoring device is used to provide a live feed of the environment from the first location.

8. A remote pet interaction system to claim 5, wherein the transmission and reception system operates over a wireless local area network connected to the internet.

9. The remote pet interaction system of claim 5, wherein the remote monitoring device is at least one of a computer, laptop, tablet, or smart phone that allows operators to create profiles and share remote interaction device data.

* * * * *